Nov. 18, 1952  J. V. RAWLINGS  2,618,388
SYSTEM FOR CLASSIFYING, CONCENTRATING, AND SEPARATING ORES
Filed Nov. 6, 1947  7 Sheets-Sheet 1

INVENTOR.
JACK V. RAWLINGS
BY
Jerome W. Paxton
AGENT

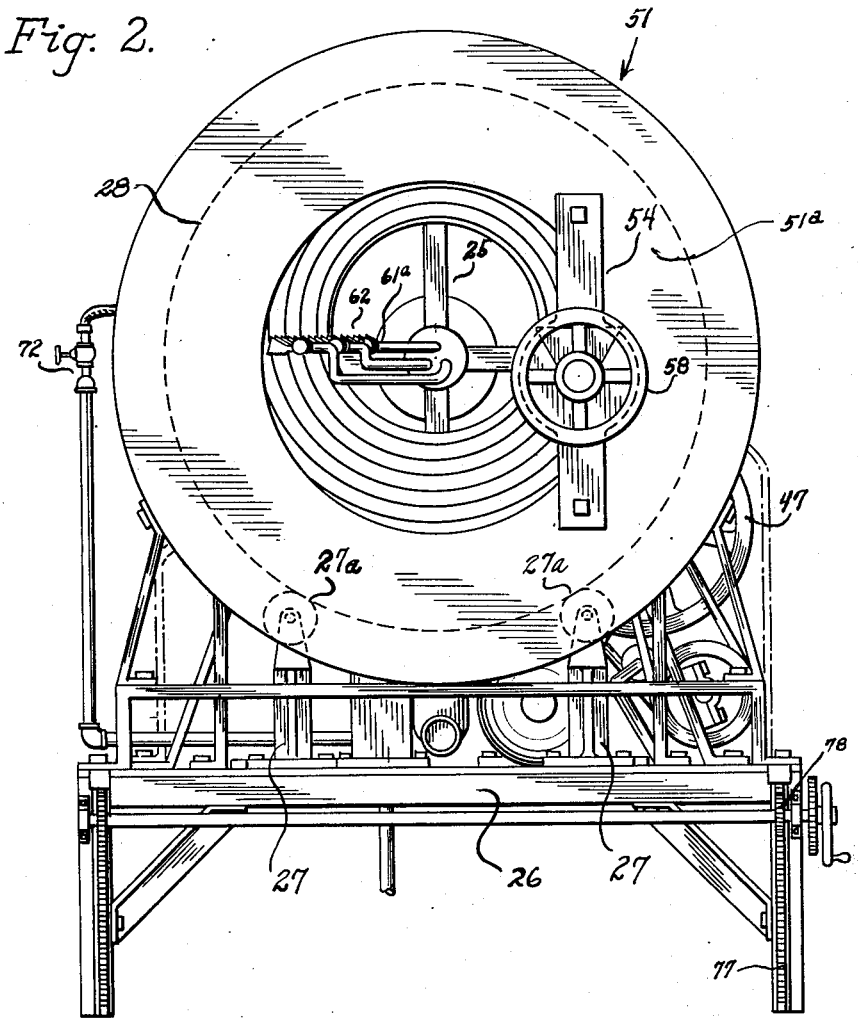

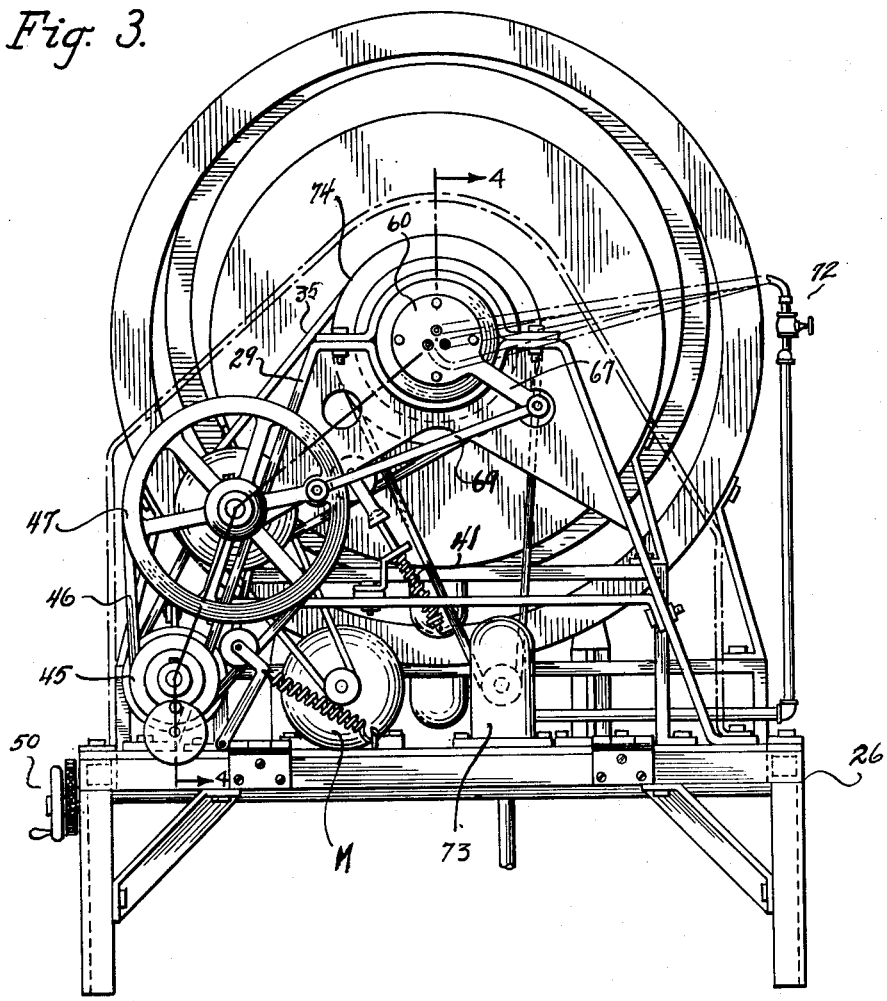

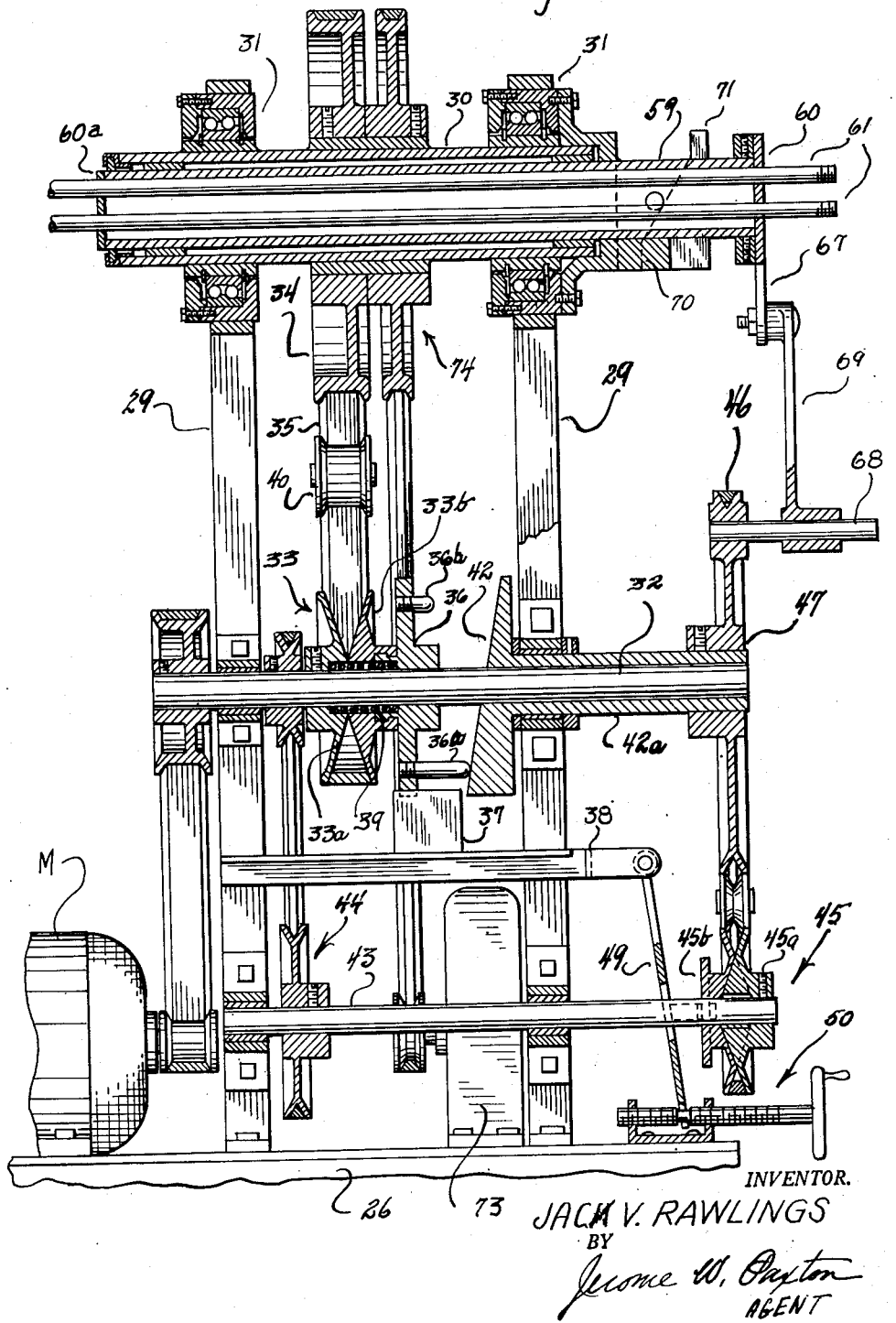

Nov. 18, 1952  J. V. RAWLINGS  2,618,388
SYSTEM FOR CLASSIFYING, CONCENTRATING, AND SEPARATING ORES
Filed Nov. 6, 1947  7 Sheets-Sheet 5
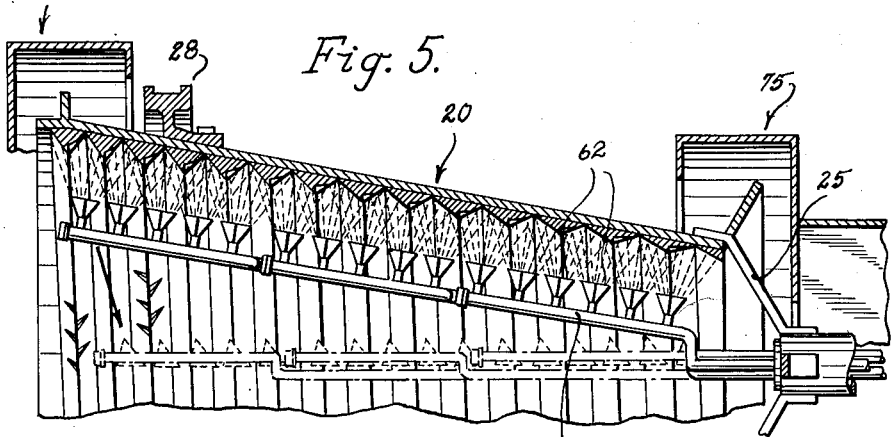
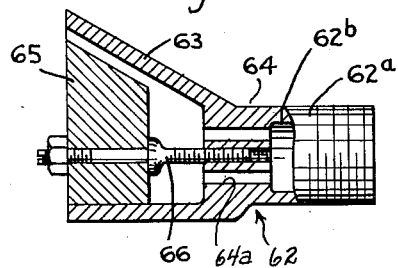
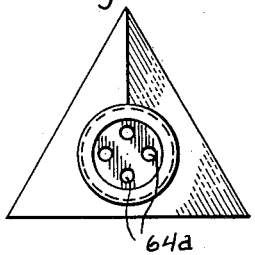
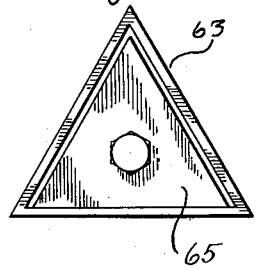
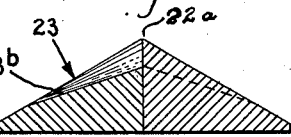
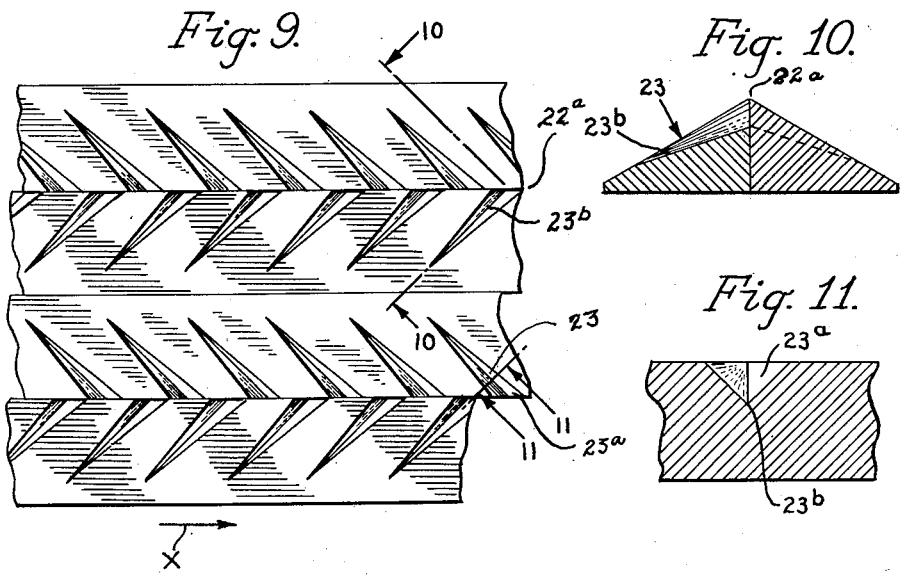
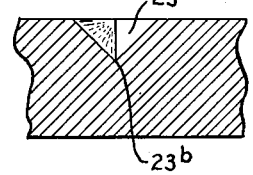
INVENTOR.
JACK V. RAWLINGS
BY
Jerome W. Paxton
AGENT Nov. 18, 1952   J. V. RAWLINGS   2,618,388
SYSTEM FOR CLASSIFYING, CONCENTRATING, AND SEPARATING ORES
Filed Nov. 6, 1947   7 Sheets-Sheet 6
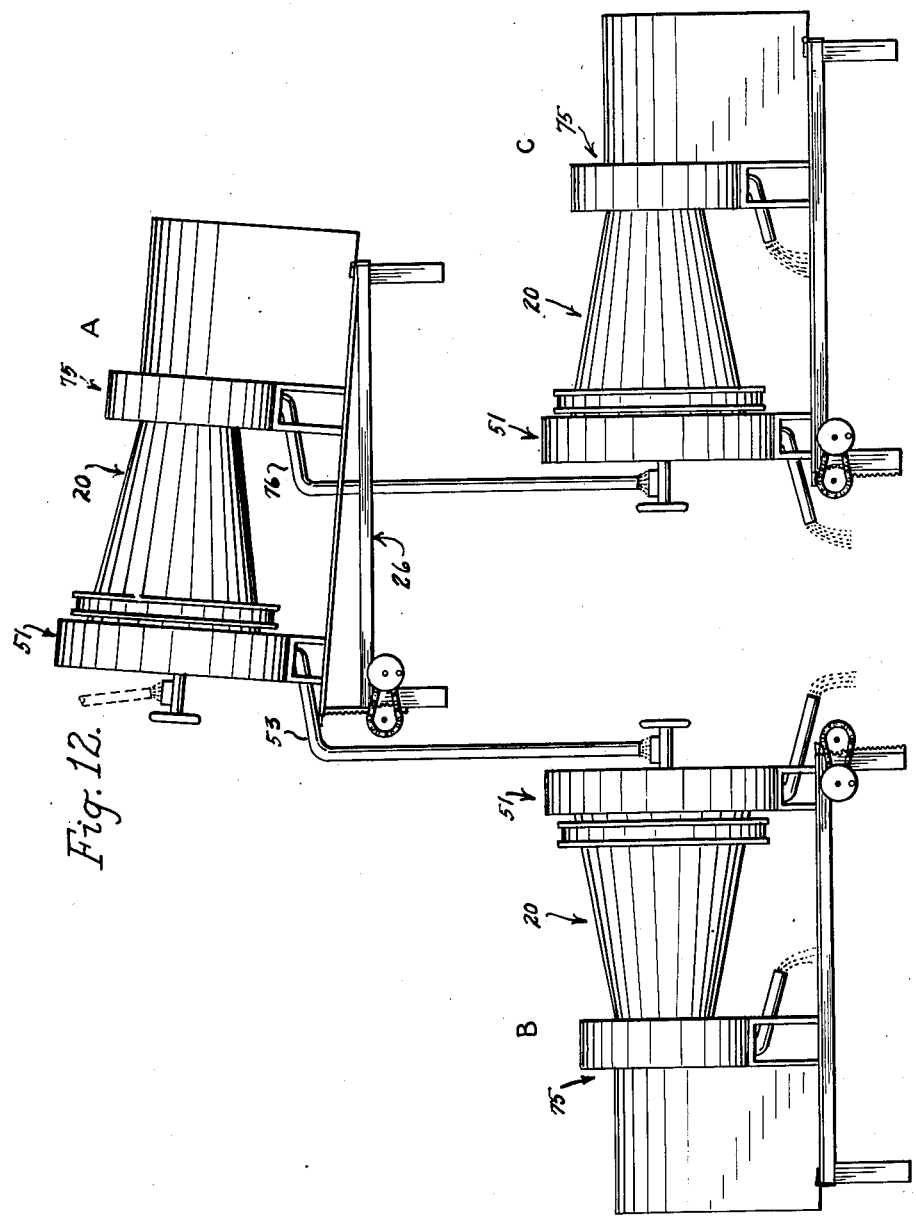
INVENTOR.
JACK V. RAWLINGS
BY
Jerome W. Paxton
AGENT Nov. 18, 1952 J. V. RAWLINGS 2,618,388
SYSTEM FOR CLASSIFYING, CONCENTRATING, AND SEPARATING ORES
Filed Nov. 6, 1947 7 Sheets-Sheet 7

INVENTOR.
JACK. V. RAWLINGS.
BY
Jerome W. Paxton
AGENT

Patented Nov. 18, 1952

2,618,388

UNITED STATES PATENT OFFICE 2,618,388

SYSTEM FOR CLASSIFYING, CONCENTRATING, AND SEPARATING ORES

Jack V. Rawlings, Contact, Nev., assignor of one-half to Loretta P. McLean, Contact, Nev.

Application November 6, 1947, Serial No. 784,446

11 Claims. (Cl. 209—451)

This invention relates to a system for classifying, concentrating and separating ores.

In prior practice, these operations are performed in various ways, many different methods having been developed for producing these effects, these generally having been more or less individualized so as to provide these operations as individuals rather than the result of a single operation. In some instances, the operations are more or less of a mechanical type provided by special forms of apparatus, the modern practice, however, tending more in the direction of the use of what are known as flotation methods for providing some of the activities that are inherently required for the efficient action of a plant devoted to the purpose of obtaining the mineral values of the ores being handled.

As a result, the plant requirements for an efficient development become very large and expensive, both in cost of installation and for operation, especially where the flotation methods are being employed. Hence, such plants generally operate in connection with ores in which the mineral content is of sufficient value to justify the cost of operation, the ores of less value being cast aside, due to the fact that the values which would be obtained therefrom are comparatively small and would therefore not justify their treatment, since the cost would exceed the returns which could be obtained in disposing of the product.

While the present invention is not limited in its service to the treatment of ores of such rejected type, the invention is such as to make possible the treatment of many of these rejected ores, since the cost of operation is sufficiently low as to justify the treatment of a great many of such rejected ores.

In practice, a system of the type of the present invention provides a reduction in the operating costs of at least 50 per cent as compared with the operating costs of the commercial forms of flotation processes. Obviously, this condition makes it possible to profitably treat ore values such as would be deemed unprofitable with the commercial flotation process systems, since profitable treatment of ore values within the rejected zone can be provided, a condition which enables the present system to be advantageously used even when treating rejected residues of the commrcial flotation practices.

In the present invention, this is made possible through combining the various operations in a single apparatus which may be made up of a single unit or of a succession of units in which the product of one unit can form the supply for a similar unit into which a product of the first unit is delivered. For instance, where the ore is of simple type, a single unit may be sufficient for the treatment; where the ores are complex, additional units may be employed, with the initial unit active to separate a mineral from the initial supply, with the remainder rejected and forming the basis for the separating action of a second unit; or the product of the first unit may be made up of a pair of minerals and these, then separated within a unit to which the product is delivered—with highly complex ores this practice may be developed to an extent where the initial unit separation is a rough classification with the products then subjected to the action of second stage of units and even to a third stage of units dealing with the products of the second stage.

The invention which forms the basis of the system herein disclosed, is in the form of one or more similar units each of which is designed to provide for the classifying, concentrating and separation of the content which initially was in the form of a pulp made up of finely ground ore and a water carrier. The unit in operation treats increments of such pulp by subjecting the increment content to a type of operation such that in the course of time and during continuous operation, there will be a gradual concentration of a particular ore value or group of values, the concentration being gradual, with possibly a classification of rejected values, making it possible to isolate particular values simply by the unit in operation.

In this unit operation, several of the forces of nature are utilized for the purpose of producing the action. For instance, centrifugal force in an approximately infinite number of values is utilized; in addition, the quality of "coefficient of friction" is made active in providing for the concentration. These, in addition to speed variations of the unit, plus the controlled use of water supplies, all provide for setting up an activity upon the content of the pulp such that practically all of the individual particles of the pulp are each acted upon during the unit operation, with these actions effective to produce the classifying, concentrating and separating operation. With complex ores, a plurality of units may be employed with the mineral products of the initial and main unit then forming the supply for the operation of the succeeding unit or units, the number of units depending somewhat upon the character of the complex ores and the particular mineral values which it is desired to be isolated.

The possibility of using centrifugal force and the co-efficient of friction in the system is due to the variations in specific gravities and the textures of the different metals. As is well known, the specific gravity differs with one metal relative to another, whether the metal be in bulk form or in the small individual particles which result when the ore is ground for making the pulp, the distinction being simply in the particular value of the specific gravity, the small particle having the proportionate value provided by the difference in size. Since these values become very small when the small particle size is produced through grinding of the ore, it is apparent that to distinguish between the particles of different metals by centrifugal force activity, requires the use of infinite numbers of centrifugal force values in order to set up a distinguishing factor. The unit of the present system is designed in such way as to produce the infinity of such values that is needed to provide this distinguishing characteristic; through the form of the unit structure plus the normal speed variations which are themselves capable of being adjusted, together with the controllable use of a liquid such as water as a means for producing action within the unit, the active system will gradually produce the classifying, concentrating and separating action.

The concentration of particles of a particular metal is brought about by the fact that where two particles of the same metal are brought into actual contact, under pressures such as may be set up through centrifugal force action, the similarity in texture between the two will serve to produce an approximate mating condition between the opposing surfaces in contact; the variations in texture between metals are such that the variations which provide for difference in resistance between component parts of the particle, cooperate to produce such mating condition as the particles are moved relative to each other while in contact in the operation of the apparatus; when this condition becomes complete, there is set up the coefficient of friction value between the particles that is to be found where two similar metals are brought into contact under conditions where friction may result, this value differing with different metals. The particles are not amalgamated in producing the concentration, but the concentrated mass is gradually developed through the accretion of particles gradually assembled through the unit operation and held in their concentrated form by the coefficient of friction which is developed as the particles are added to the concentrated mass in the presence of the pressures which are set up through the centrifugal force conditions and which are present while the particles and the concentrated mass remain within the active unit; the coefficient friction value referred to serving to hold the mass in its concentrated form after leaving the unit.

To these and other ends, therefore, the nature of which will be better understood as the invention is hereinafter more fully disclosed, said invention consists in the methods and apparatus hereinafter more particularly described in detail, illustrated in the accompanying drawings, and more particularly pointed out in the appended claims.

In the accompanying drawings in which similar reference characters indicate similar parts in each of the views, Figure 1 is a view partly in side elevation and partly in vertical section of a unit in accordance with the present invention; the view includes a section of the pulp delivery structure, although this structure is, in fact, located at a point which would not be included within this view, the structure being displaced from its actual position in order to illustrate certain dimensional characteristics relative to other portions of the unit.

Figure 2 is an end elevation of the structure of Fig. 1, the view looking toward the larger end of the drum;

Figure 3 is a vertical end view looking in the direction of the opposite end of the drum.

Figure 4 is a vertical section, on an enlarged scale, showing the driving structure for the drum assembly.

Figure 5 is a partial horizontal section of the drum zone, and showing more particularly the arrangement of the water spray structure.

Figure 6 is a detail view, shown partially in section and partially in elevation of one of the nozzles of the spraying structure.

Figure 7 is an end elevation looking toward the left in Fig. 6.

Figure 8 is an end elevation of the nozzle of Fig. 6 when viewed from the left of said figure.

Figure 9 is a detail plan view showing a portion of two adjacent scroll riffle convolutions with their riffles.

Figure 10 is a sectional view taken on line 10—10 of Figure 9.

Figure 11 is a detail cross section taken on the line 11—11 of Figure 9.

Figure 12 is a schematic view showing a battery of three units mounted in cooperative relation.

Figure 1:
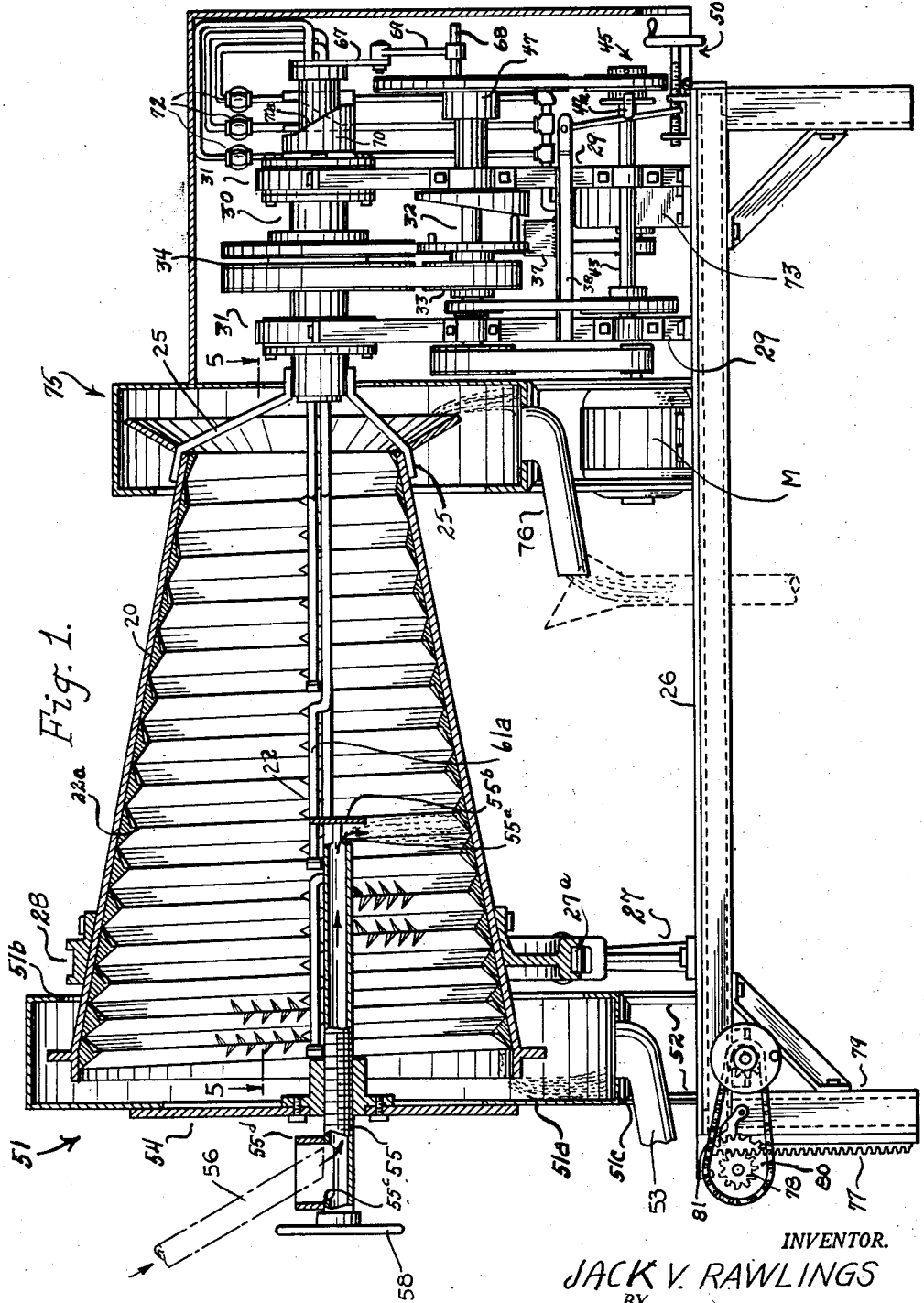

The classifying, concentrating and separation activities of a unit take place within the conical drum 20 mounted for movement about an axis, such movements serving as a part of the apparatus for producing these activities; not through a predetermined regimen with respect to the pulp material but producing the classifying, concentrating and separating actions as a result developed as the particles of the pulp traverse the drum in the directions of its end zones.

The drum 20 is of general conical shape and open at both ends. Its internal face is provided with a spirally arranged formation, hereinafter broadly termed a "scroll riffle;" the general arrangement of the latter being indicated somewhat in Figure 1. Each convolution of the scroll riffle differs slightly from the adjacent convolution, each convolution, however, being of general triangular cross section of the isosceles type as indicated somewhat in Figure 10, the base of the convolution being secured to the inner face of the drum, the inclined sides of the convolution meeting substantially midway of the length of the base—width of the convolution—to provide the apex 22a of a convolution 22 of the scroll riffle 21; as particularly shown in Figure 1, the width of the base portion of the convolution gradually increases toward the smaller end of the drum, with the altitude represented by the apex 22a gradually being reduced in height, thus providing for a gradual change in characteristics of the scroll from that shown at the larger end of the drum to that shown at the smaller end.

Each of the side faces of the convolution is provided with riffles 23, these being in the form of grooves, which, in practice have their length extending at an angle of approximately 45 degrees from a line which represents the apex of the convolution. The length of a groove 23a of riffle 23 is such as to be included within the width of the side on which it is located—being less than such width—a cross section of the groove—see Figure 11—showing the groove as of V-shape in cross section, the angularity of the sides being approximately 45 degrees from the vertical. The groove depth is greatest in a vertical plane through the apex of the convolution, the dimensions of the groove decreasing in a direction away from such plane until the groove disappears at a point on the side face spaced from the end of the base. Since the side face extends angular to the base, this arrangement of the groove causes the bottom 23b of the groove to extend angular to both the angle of the side face and of the base. As is apparent, the difference in angularity of the side faces of the several convolutions causes the bottom of the groove of the riffles to become less angular to the base in the direction of the smaller end of the drum; in practice, the riffles in the end zone of the smaller end of the drum tend to approach parallelism with the base. In other words, the riffles grow steeper in type in the direction of the larger end of the drum.

The riffles 23 on one of the side faces of the convolution are spaced relative to each other, with the riffles of the opposite side face opposed to such space between riffles—in other words, the riffles of the opposite side faces of a convolution are staggered with respect to each other, but extend in the same general direction relative to the plane of the travel path of the inner end of each riffle with the angularity to such paths being generally similar but opposite in direction, so that the length direction of all of the riffles is uniformly similar, the groove 23a of one side face extending in the same general direction as the adjacent groove of the other side face with grooves of the two faces extending at opposite angles to such travel paths of the groove inner ends. This construction renders it somewhat difficult to provide the proper machining operation for the production of the grooves and for this reason, the convolution is practically formed in two halves with the dividing line corresponding a vertical plane through the apex, thus permitting each half to be machined with the cutting tool moving from the deeper end of the groove to its disappearing point. The two halves are then secured together in suitable manner, as by welding or the like.

The drum 20 is mounted for movement relative to an axis of revolution and the drum is so mounted that the drum axis is not alined with such axis of revolution but extends parallel thereto so that the drum axis travels in a circular orbital path about such axis of revolution. In practice, the drum axis is spaced from the axis of revolution a distance of approximately ¾ inch, so that the circular path of the drum axis is approximately 1½ inches in diameter. This particular distance is, however, more or less illustrative, since it may be varied to meet individual conditions.

To obtain this off-center condition of the drum, the smaller end of the drum is supported on the shaft 24 by arms 25, two of which are shown in Figure 1, the arms being of different length, the difference in length providing for positioning this end of the drum in its off-center position.

The larger end of the drum is supported by a structure 26 carrying a pair of supporting members 27, the upper end of each of which carries a roller 27a, members 27 being located equidistant from a vertical plane extending through such axis of revolution. The drum itself carries a track 28, the peripheral face of which is adapted to rest upon and ride on the rollers 27a. However, while the track periphery is circular in contour with the axis of such face coincident with the axis of revolution, the track is so formed as to mount the drum with the drum axis offset from such axis of revolution the distance referred to, thus providing the parallelism between the drum axis and such axis of revolution. As a result, the radial depth of the track outside of the drum varies due to the eccentric mounting of the drum within such track, it being understood, of course, that the eccentricity of this end of the drum is exactly similar to the eccentricity provided at the opposite end, so that the drum axis throughout the drum length will travel in the circular path about the axis of revolution referred to above.

Figure 13:
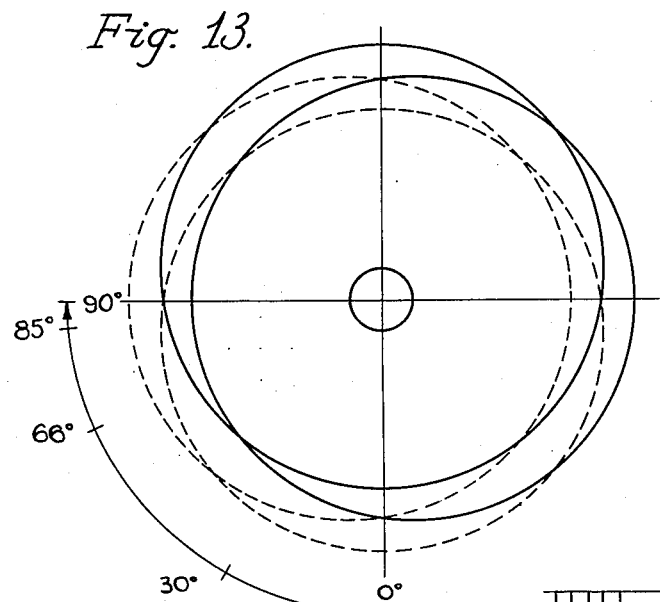
Figure 13 is a diagrammatic view showing relative positions of the drum during the revolution about the axis of revolution.

This drum mounting is important and in Figure 13, it can be readily seen that when the track is positioned so that its larger external radius extends on a vertical plane through the axis of revolution and below the drum, the diametrically opposite portion of the track will extend on such plane but have the least external length of radius; at such time, the external radius of the track on a horizontal plane extending through the axis of revolution will be of intermediate length and uniform on the opposite sides. As the track rotates around the axis of revolution, this condition as to the relative lengths of the external radius of the track will continue but with a constantly changing position—in other words, the conditions pointed out above will be rotated bodily about the axis of revolution.

This arrangement sets up a particular condition with respect to the riffles 23. For instance, a riffle located at the bottom of the drum when the track is in the full lines position of Figure 13, will advance in a truly circular path about the axis of revolution; at the same time, a riffle which would be located at the top of the drum and on the vertical plane through the axis of revolution, would also advance through a circular path about the axis of revolution, but the two paths would be concentric and separated a distance equal to the amount of eccentricity provided by the particular mounting. Obviously, riffles which are located between these two riffles (which are assumed to be on the vertical plane referred to) also travel in circular paths about the axis of revolution, but these paths would not be coincident but concentric, due to the fact that each is located in a track zone of different external radial length from those of adjacent riffles. In other words, each riffle travels in a circular path about the axis of revolution, but, due to the eccentricity of the drum relative to such axis of revolution, the diameters and the peripheral length of the different travel paths will differ as between adjacent riffles, although the difference may be slight.

Figure 14:
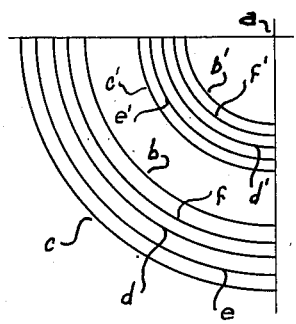
Figure 14 is a diagrammatic view designed to illustrate differences in centrifugal force values within the active segment of the drum, the view showing the paths of travel of certain riffles of a scroll convolution, the view indicating the paths for the riffles of convolutions at the larger and the smaller ends of the drum.

The effects produced by this structure in service are of several different types; one of these is illustrated diagrammatically in Figure 14. As presently pointed out, the actual activities of the drum in the way of producing the combined actions referred to upon the ore content, are practically confined to a 90 degree portion of the revolution of the drum—this range extending from the nadir point of the drum path to a mid position in the upward travel of the drum in the direction of such path; the ore pulp is delivered to the drum preceding such nadir point in the direction of travel of the drum, but the classifying, concentrating and separating action has its beginning at such nadir point. Hence, Figure 14 is restricted to the quadrant of revolution of the drum in which this activity takes place.

In Figure 14, $a$ indicates the axis of revolution, with the several lines shown indicating the respective travel paths of several of the riffles to be found on an inclined face of a convolution of the scroll. For instance, referring to Figures 1 and 14, the line $b$ will indicate the travel path through this zone of the riffle carried by the outer face of the scroll convolution at the larger end of the drum, the particular riffle being that shown at the bottom of Figure 1; line $c$ will indicate the travel path of the riffle diametrically opposite that referred to—shown at the top of Figure 1 and which would be rotated to the nadir position when the drum has moved through half its travel path—when such riffle is thus made active within this particular zone; line $d$ would represent the travel path of a riffle positioned midway between these two riffles, when such riffle reaches the nadir point; lines $e$ and $f$ represent travel paths of riffles intermediate the three riffles referred to. Lines $b'$, $c'$, $d'$, $e'$ and $f'$ represent corresponding travel paths of the riffles of the outer face of the scroll convolution positioned at the smaller end of the drum and which, since the drum is moved bodily about the axis of revolution, will have their periods of activities within the same quadrant.

It may be noted that these lines of the diagram do not present concurrent activity within the quadrant zone. For instance, the riffle having the travel path $c$ is at the top of the drum at the time the riffle producing the travel path indicated as $b$ is becoming active within the quadrant, so that the travel path $c$ would become active only at a later period. In other words, during activity of the riffle traveling the line $b$ path, only the riffle producing the line $f$ path would become active concurrently with that producing line $b$ and then only after the riffle of line $b$ had advanced about half the length of its travel path within the quadrant; the riffle producing line $d$ would become active at the nadir point only as the riffle of line $b$ is passing out of the quadrant; the riffles producing lines $c$ and $e$ would be inactive in the quadrant while the riffle of line $b$ is active. Similar conditions, of course, apply with respect to the lines $b'$ to $f'$. In either case, however, the riffles having the travel paths indicated will traverse this quadrant at some time during the revolution of the drum in its path.

While the path of travel of only five of the riffles is shown in Figure 14, it will be understood that each of the riffles contained on the outer side face of such convolution at the larger end of the drum will produce its individual path of travel, with such path lying between lines $b$ and $c$, these individual paths being due to the eccentric mounting of the drum relative to the axis of revolution. Hence, within the zone between lines $b$ and $c$, will be found a number of such concentric paths equal to the number of riffles that are found in one half the length of such convolution face, with each riffle traveling its individual path through the quadrant at some time during the revolution of the drum in its path.

The above description of Figure 14 refers more particularly to the riffles carried by the outer face of the end convolution of the larger end of the drum, so far as concerns the riffles of such face found on the omitted portion of Figure 1, the riffles referred to being those contained within 180 degrees of the circumference of the drum; the description indicating that line $b$ represents the path of travel of the riffle at the nadir point in Figure 1. Since the drum is mounted eccentric to the axis of revolution $a$, the riffles carried by the remainder of the convolution circumference will provide similar activities excepting that the order of the riffles reaching the nadir point will be reversed. For instance, when the riffle at the top of Figure 1 reaches the nadir point and begins its travel in the path of line $c$, the succeeding riffle to reach the nadir point would have the slightly smaller radius that was present with the riffle preceding the riffle which produces the travel path $c$, while the succeeding riffle would provide a still smaller radial length, etc., thus reversing the conditions which were referred to above as ranging from the path $b$ to the path $c$.

In other words, the lines $b$—$c$ represent a band of individual riffle travel paths which, based on the showing of Figure 1, would have the nadir point riffle on line $b$, the riffles successively reaching this point with increasing radii until the half revolution brings the active line as line $c$, thus traversing this band from line $b$ to line $c$. As the drum continues to move in its orbital path, the direction of travel through this band is reversed, running from path $c$ to path $b$. Hence, during a cycle represented by a complete revolution of the drum in its path, the successively active riffles will first traverse this band from paths $b$ to $c$ and then progressively return to path $b$ to begin the succeeding cycle.

While the riffles of the opposite side face of the outer convolution are staggered with respect to the face described, the spacing is such that the displaced relationship is not sufficient to materially change the conditions as between the two faces so that it may be considered that the riffles of the opposite faces of the convolution are traveling practically in the paths of the immediate adjacent riffle of the other face.

Figure 14 shows the presence of two of such bands, one at the larger end and the other at the smaller end of the drum. As is apparent, each of the convolutions of the scroll will present conditions similar to the above with its side faces providing a band individual to itself, due to the fact that the drum wall is tapered from the larger to the smaller end, and while the height of the apex of each of the convolutions is shown as decreasing in Figure 1, the rate of decrease is less than that provided by such taper; but the individual bands will be displaced—although but slightly—from the band $b$, $c$; for instance, the inner path $b$ for the second convolution is displaced slightly in the direction of band $c'$ with the band width including portions in which the paths are within the band zone shown, each convolution adding this condition until the band zone shown as $b'$, $c'$, is reached so that, in effect, practically the entire radial distance from path $b'$ to path $c$ contains a larger number of paths—approaching the number of riffles within the drum—with the paths as individuals, and with each thus presenting its characteristic of individual peripheral speed conditions represented by the length of the lines within the quadrant. As a result, a revolution of the drum presents the conditions of a large number of peripheral speed rates active concurrently but only as having potential value during such rotation within the revolution, actual value depending upon the presence of ore material within a riffle.

If the speed of revolution of the drum in its orbit were constant, the lines of Figure 14 could be deemed to present the centrifugal force values which would be developed by such revolution. However, as presently pointed out, the system provides for such revolution of the drum at varied speeds, thus affecting the centrifugal force values present at any time, such variations, however, not disturbing the showing of Figure 14, since the band conditions shown in the figure are such as to be present at all speeds of revolution, the figure presenting the action of the drum structure and its mounting which does not change during the operation.

From the above, it will be understood that the drum, its mounting and the particular type of scroll riffle carried thereby, provide a construction which permits of developing one of the components of the centrifugal force values which form one of the fundamentals of the present invention, this being the length of the radius which produces the respective travel paths of the individual riffles. As will be understood, a vast number of radii are provided in the length of the drum, a band $b$—$c$ simply indicating a few of the radii found on one side face of the convolution, each convolution providing a band characteristic of similar type, with the result that the number of radii present is almost infinite. There may be duplications of radii other than that provided by the pair found in each convolution, but the remaining duplications are in other convolutions, thus being displaced lengthwise of the drum.

Another component required in determining the centrifugal force values is that of the speed of rotation of the drum, and a description of the drive for the drum is now presented, reference being had more particularly to Figure 4 of the drawings.

29 indicates a pair of supporting standards in spaced apart relation and located adjacent the smaller end of the drum, as indicated in Figure 1. These standards carry a plurality of shafts, one of which, drum shaft 30, is located in the top zone of the standards and is tubular and mounted in suitable bearings 31.

32 is a drive shaft, being located at an intermediate position in the vertical length of the standards, and is driven at reduced speed from a motor M carried on the supporting structure 26. An adjustable drive pulley 33 is carried by the shaft and is adapted to have a belt drive connection 35 with a driven pulley 34 carried by shaft 30.

This drive relation between shafts 32 and 30 is such that provision is made for varying the speed relationship between the two shafts, the arrangement being such that, through cam control, the constant speed of the drive shaft will be translated into drum shaft speeds ranging between a maximum and a minimum speed, in which the speed progressively varies uniformly between these speeds. For instance, with shaft 30 rotating at maximum speed, its speed progressively decreases until the minimum speed is reached, whereupon the variations, in speed-increase direction, follow until the maximum speed is reached, whereupon the cycle is continually duplicated, thus providing for the movement of the drum about its axis of revolution, it being understood that the axis of shaft 30 corresponds to such axis of revolution $a$.

To produce this action, pulley 33 is of particular type, its opposite sides being individual with side 33$a$ secured to and rotating with shaft 32. The opposite side 33$b$ is loose relative to shaft 32. The inner faces of said sides are somewhat conical with the conical faces opposing each other, belt 35 being mounted between said conical faces. Side 33$b$ has a flange which contacts with a control member 36 also loose on shaft 32, but which is held from rotation by a member 37 carried by a frame member 38, member 37 engaging within a recess in the periphery of the control member 36. 39 indicates a spring which surrounds shaft 33 within a recess of the fixed side and which extends through an opening in the loose side 33$b$ and into contact with a face of the control member, the spring placing control member 36 under pressure to move the member toward the right in Figure 4; while the spring 39 has no direct effect upon the loose side 33$b$, the latter will move with control member 36, due to the operation of the structure now to be described.

Drive belt 35 is of a length such as to be substantially taut when in the position shown in Figure 4. However, one of the flights of the drive belt is provided with an idler 40, the mounting of which is such as to include a spring 41 (Figure 3), so that the idler is being constantly actuated by the spring to draw upon the flight, thus serving the functions of a belt tightener. Such belt tightener is therefore constantly urging the portion of the belt 35 traversing the pulley 33 to move inward between the opposing conical faces of the sides 33$a$ and 33$b$. Hence, if control member 36 is moved toward the right in Figure 4 by spring 39, spring 41 of the idler becomes active to enlarge this flight of belt 35 and draw the belt inward over the opposed conical faces, thus causing the loose side 33$b$ to trail the movements of control member 36 in this direction.

Control member 36 is movable relative to member 37 during all shifting movements of the member, member 36 thus being held against rotation although capable of being shifted in the direction of length of the axis of the drive shaft 32. While movement of member 36 toward the right is provided by spring 39, such movement is controlled by a cam 42, operative to permit such movements of control member 36 toward the right in Figure 4 and also to return member 36 to the position shown in such Figure 4, member 36 being provided with a pair of adjustable pins 36$a$ and 36$b$ of unequal length and oppositely positioned, these pins being adapted to operate properly in connection with the cam face of cam 42. As shown in Figure 4, the long pin 36a is contacting the high point of the cam which thus retains member 36 in the position shown. As the cam rotates, the receding cam face permits control member 36 to move toward the right, under the action of spring 39, with pin 36c remaining in contact with the face, this continuing until the low point of the cam reaches such pin, at which time the high point of the cam contacts with the short pin 36b to prevent further movement of member 36 toward the right. As the cam continues its rotation, the face of the cam active with the pin 36a applies pressure on pin 36a to move control member 36 in the opposite direction, this continuing until the high point of the cam reaches the position shown in Figure 4. During this return movement of control member 36, it becomes active on the loose side 33b to move such side in similar direction, thus applying pressure upon the edge of the belt 35 in opposition to the power of spring 41, to thereby cause the belt to move toward and into the position of Figure 4.

Through this arrangement, the drum revolution will be at speed rates controlled by the position of belt 35 within the adjustable pulley 33 with the maximum speed provided when the belt is in the position shown in Figure 4, and with the minimum speed provided when belt 35 has moved inward between the sides 33a and 33b to its inward position as permitted by the operation of cam 42, the low speed being at the time when the high point of the cam face is cooperating with pin 36b; while the dimensions shown in Figure 4 are more or less illustrative, the arrangement shown would set up approximately conditions in which two revolutions of the drive shaft would provide substantially one revolution of the drum, when belt 35 is in the position shown in the view, and require four revolutions of the drive shaft to provide a revolution of the drum when belt 35 is in its inner position, cam 42 controlling the speed rates between these maximum and minimum speeds.

43 indicates a control shaft mounted in bearings on the standards 29 and located below drive shaft 32, the shaft 43 is driven from the drive shaft through a drive belt and pulley structural units indicated broadly as 44 and in which the pulleys are secured to the respective shafts, so that shaft 43 is in definite drive and speed relation to the drive shaft. At one end of shaft 43 is mounted an adjustable pulley 45 of the type of pulley 33, having a fixed side 45a and a loose side 45b with the opposing faces of these sides formed conical. Since the fixed side rotates with shaft 43, the structure serves as a drive formation cooperative with a belt 46 which also trains over a pulley 47 which is carried by the tubular shaft 42a of cam 42. Shaft 42a is rotatable freely on drive shaft 32, but is held from endwise movement thereon. Hence, when pulley 47 is rotated by adjustable pulley 45, the cam 42 will be rotated at the speed determined by the relation between the dimensions of pulley 47 and the dimensions which may be active with respect to pulley 45. Drive belt 46 is equipped with belt tightener similar to idler 40, thus placing belt 46 under continuous tension. Hence, if the loose side 45b is moved away from the fixed side 45a of pulley 45, belt 46 will move inward on the pulley to thereby decrease the effective diameter of pulley 45; or, if the belt is in an inner position and the loose side 45b is moved toward the fixed side 45a, the belt will be moved outward, thus increasing the active diameter of the pulley. The action is somewhat similar to that described in connection with pulley 33, with the exception that the position of the loose side 45b is controlled by manually adjustable means, and the position of the side remains constant until a new adjustment is had.

Any suitable control means in this respect may be employed, that shown being in the form of a lever 49 having one end secured to the frame member 38 and its opposite end cooperating with an adjusting device 50 mounted on the structure 26, lever 49 carrying a projection 49a which cooperates with the loose side 45b. When the lever 49 is moved toward the left in Figure 4, side 45b is moved away from side 45a by the belt tightener 48 which causes belt 46 to move inward on pulley 45. If the lever is moved in the opposite direction, it forces the loose side 45b toward side 45a, and thus shifts the belt 46 outwardly on the pulley.

From the above, it will be understood that the drive shaft 32 and the control shaft 43 rotate at constant speeds; cam 42 rotates at manually adjustable speeds, but when adjustment has been had, the rotation is at constant speed. On the other hand, drum shaft 30 rotates at variable speeds, this being due to the fact that the drive from shaft 32 is through the adjustable pulley 33, which, through the action of the cam 42, causes the drive ratio between pulley 34 and pulley 33 to vary between maximum and minimum speed conditions; for the purpose of the present description, the respective ratios in these extremes, as indicated in Figure 4, are two revolutions of the drive shaft for one revolution of the drum shaft (2:1) in the maximum speed extreme, and four revolutions of the drive shaft to one revolution of the drum shaft (4:1) in the extreme minimum position; since the cam 42 is of constant fixed dimensions, it will be understood that these ratios are constant in service, regardless of the speed changes which may be provided through the manual adjustment of pulley 45.

For the purpose of explanation, it is assumed that the extreme maximum speed ratio as between pulleys 47 and 45 is 26:15 (15 revolutions of pulley 47 to 26 revolutions of pulley 45), while in the extreme minimum position of belt 46, the ratios will be 26:8 (26 revolutions of pulley 45 to 8 revolutions of pulley 47). To obtain a glimpse of the possibilities as to speeds, etc., the following explanation is made, based upon the above data:

Assuming that the manual adjustment has placed belt 46 in its maximum speed position, one revolution of the cam will be provided by 1.733 revolutions of control shaft 43, with the latter provided by 2.817 revolutions of the drive shaft 32, the latter being driven from the motor M. When the manual adjustment is at its extreme minimum speed value, control shaft 43 has 3.25 revolutions for one revolution of the cam, while drive shaft 32 will have 5.281 revolutions. Since the drum shaft is rotated from drive shaft 32, it is possible to approximate the extremes of the speed limits of the drum shaft from the above data.

For instance, in the position of belt 35 shown in Figure 4—the extreme maximum speed—the drum shaft would rotate 1.408 revolutions while the cam 42 is making one revolution; when belt 35 is in its extreme inner limit, the drum shaft will rotate .704 revolution during one revolution of the cam 42. When belt 46 is in its extreme minimum speed position, the drum shaft will rotate 2,645 revolutions to one revolution of the cam 42 when belt 35 is in the extreme maximum speed position, and will rotate 1.322 revolutions in the extreme minimum speed position.

As will be understood, the action of the cam 42 constantly varies the speed ratios between pulleys 34 and 33, so that as the cam rotates, the speed ratio between the pulleys progresses— first in one direction and then in the other direction—between the 2:1 ratio and the 4:1 ratio, thus providing for an infinite number of ratio values between these two values, in which the ratio 3:1 is an intermediate value, these variations being constant in direction and progression from one extreme to the other and then through a return in which the ratio progression is reversed, the result being that there is a zone in each extreme in which there is an approach and a recession in which the rate of progression is equal on opposite sides of the actual point at which the progression shifts from one direction to the other; one of these points is provided by the high point of cam 42 and the other by the low point of such cam.

As is apparent, the drum shaft values given in the above tabulation do not give the actual distance of advance of the drum, representing simply values provided in the extreme positions of belt 35; since cam 42 has a symmetrical active face, it is possible to approximate the actual distance of the drum advance by averaging the values indicated. For instance, with pulley 45 adjusted to provide for maximum speed, the drive shaft 32 will have 2.817 revolutions to produce one revolution of cam 42, and at the same time would produce a drum advance through a distance corresponding to 1.05 revolutions; similarly with pulley 45 adjusted to the minimum speed conditions, the drive shaft 32 would have 5.281 revolutions to produce one revolution of the cam 42, and at the same time provide an advance of the drum through a distance equivalent to 1.984 revolutions of the drum. These distinctions provide a number of factors which are of value in understanding the operation of the apparatus.

To illustrate one of these factors, the specific riffle which is on the nadir point of the drum revolution at the instant cam 42 is at its high point with the cam rotating under maximum speed conditions it will be apparent that the riffle will advance through the quadrant with a decreasing progression as to speed, although the riffle itself is traversing a path concentric with the axis of revolution; when this riffle again reaches such nadir point during the revolution, cam 42 will not have completed its revolution, so that the riffle will advance 18 degrees beyond such nadir point before the cam high point reaches its high point condition—during this 18 degree angular distance, the riffle will advance under increasing progression conditions and then pass to the decreasing progression for the remainder of the travel in the quadrant; on the next appearance of the riffle at the nadir point, similar conditions will be present, but the riffle would travel through a distance of 36 degrees before the change occurs, the succeeding appearance providing the change after an advance of 72 degrees, with the next appearance providing an advance to the 90 degree point which marks the end of the quadrant. In other words, under the conditions noted, the direction of speed progression development will have been completely reversed at the end of five revolutions of the drum from the condition of a decreasing progression to that of an increasing progression, this effect being produced through the fact that the drum rotates a distance of 18 degrees in addition to a revolution while the cam is making a single revolution. This shift in the position of the riffle during successive revolutions will, of course, continue throughout the complete revolution of the drum, so that the particular conditions just described would be repeated after the drum has made twenty revolutions, thus providing a cyclar condition of twenty revolutions which would be the operating standard under these conditions.

It will be understood, of course, that during this progressive advance of the changing points of the direction of speed progression, the riffle will have passed through the low point of activity of the cam, so that the changing point for the cam low point position will also advance; hence, there will be, at the proper time, a similar group of five revolution effects developed within the quadrant with respect to the riffle in question, but in this group the action will be the reverse of that pointed out, in that the decreasing progression will become the increasing progression and vice versa; between the activities of these groups, the direction of progression would remain constant, but made under conditions that are exemplified by the progressive advance of the changing point through the quadrant above pointed out. In other words, while the riffle may make successive appearances, each of the appearances is under different speed conditions, it being understood that the 18 degree advance of the changing point with each revolution means that the riffle will have its succeeding appearance at the nadir point under either higher or lower speed conditions than the previous appearance.

Similar conditions will be present when pulley 45 is operating under minimum speed adjustment, excepting that the values and the effects of these will be changed.

For instance, at this adjusted speed, one revolution of the cam takes place while the drum is advancing 1.984 revolutions, this number being slightly less than two revolutions of the drum for one of the cams. Consequently, the shifting points as to a selected riffle will gradually advance in the reverse direction from that indicated in the above analysis, and at an exceedingly slow rate, the general cyclar development covering approximately 240 revolutions before actual repetition. This reversal means that the change in progression would come just before the riffle again reaches the nadir point, the successive changes in this respect representing the high and low points of the cam travel.

In other words, under the maximum speed conditions referred to, the travel between the high and low point positions of the cam will take place during the drum advance through a little more than half of a drum revolution, while under the minimum adjusted speed conditions the drum advance between such high and low points will be slightly less than a complete revolution, this distinction representing the variations which provide the range of adjustment so far as the illustrative dimensions of Figure 4 are concerned. For instance, if the adjusted speed provides a ratio of 26 to 13, the drum advance for one revolution of the cam 42 would be 1.219 instead of the 1.05 above referred to. Or if the adjusted speed provides a ratio of 26 to 10, the drum advance during the period of one revolution of the cam 42 would be 1.584 as compared to the 1.05 value analyzed above.

The specific analysis thus made pertains to a particular riffle of the first scroll convolution at the larger end of the drum. The travel of the riffle provides a speed regimen of a particular type during a revolution of the drum. However, only the quadrant of the drum circumference, ilustrated in Figure 14, is active under service conditions, the remaining portions of the travel through the path being entirely inactive or, as presently explained, engaged in preparing for the activities within the quadrant.

This regimen applies individually to the remaining riffles carried by this convolution, each riffle having its individual travel path as previously explained. All of these riffles have the time length of this quadrant activity similar. There is, however, a distinction present as between the several riffles of a convolution, in that the radii of different riffles differ in length, as explained above, due to the eccentric mounting of the drum. This difference in radius length does not affect the regimen characteristics of the riffle excepting such as are brought about by this change in the length of the radius. For instance, as shown in Figure 14, the arcuate travel of the riffle traveling on line $c$ is similar to that traveling on line $b$ and both have the same time length within the quadrant; but the speed of the regimen with respect to the riffle traversing line $b$ will be less than that of the riffle traversing line $c$, due to the difference in the length of the arcs forming these paths through the quadrant. The same distinction is present between the riffles of the convolution, so that the speed regimen of even adjacent riffles on the same face of the convolution will not be exactly the same—the difference is very slight, but such difference is necessarily present, due to the variation in the length of the radius of such riffles. The same conditions will be present in connection with the succeeding scroll convolution, the riffle which is in the nadir position when the cam is at its high point, with the exception that the riffle of the second convolution is of slightly less radius length than that of the riffle of the first convolution, the radius of the riffles decreasing in length in successive convolutions, thus affecting the actual speed conditions but without disturbing the speed regimen.

As a result, there is provided within the scroll, a great number of individual riffles, each of which travels its individual path and under conditions which provide for practically individual speeds based on a speed regimen that is common to all of them. Differences may be exceedingly small—even minute—as between riffles, but they are present. The feature in this respect is of importance when considering the effects set up by the revolutions of the drum—the centrifugal force values which are developed through the movement of the drum during its revolution, the various differences as to speed and of radius length setting up corresponding differences in the centrifugal force values, due to the variations in speed and in length of the radius of the individual riffles.

The reason for the presence of this infinity of centrifugal force values can be understood from the fact that the material being subjected to the action of the apparatus is of a type in which the ore content is in the form of very small particles and hence of low weight factor type. Since the ore content of the pulp contains particles differing as to weight characteristic, if the drum is to provide for classifying and separating activities, it must be necessary to distinguish between particles even though the differences in weight value and other characteristics are minute. The detection of these differences is provided more particularly by the use of the centrifugal force characteristic, so that it is essential that the centrifugal force values be of practically an infinite number of values differing from each other, with the differences in value of the minutest type.

Another important characteristic in the operation of the apparatus is the character of the riffle per se. Some of the riffle characteristics have been pointed out above, in that they extend from the median line of the convolution and extend over the inclined face of a side of the convolution toward but spaced from the line which marks the division between adjacent convolutions; this arrangement is shown more particularly in Figure 9 and in section in Figures 10 and 11, which provide structural characteristics of the riffle. An important feature of these characteristics is the fact that the direction of length of the groove which provides the riffle extends at an angle of approximately 45 degrees to the path of travel of the inner end of the riffles, with the angularity causing the length of the riffle to have a trailing aspect with respect to the movement of the inner end of the riffle; this is indicated by the arrow "X" in Figure 9, the arrow indicating a direction of travel of the convolutions during drum advance. In addition, the groove which produces the riffle is of V-shape (Figure 11) with the bottom of the groove extending at an angle to the base but of less angularity than the angularity of the side of the convolution (Figure 10).

These characteristics provide a definite and important function in the operation of the apparatus. For instance, when the inner end of the riffle reaches the nadir position of its path of travel, the remainder of the riffle—being of trailing characteristic—will be extending in a direction away from the quadrant, into which this position of the riffle forms the entrance; hence, the vanishing point end of the riffle will not reach such nadir position until the drum has advanced a small distance. In this position, the vanishing point end of the groove would tend to be slightly raised with respect to its position at the nadir point, so that the bottom of the groove would have a slightly different relation to the path of travel of this end of the riffle than it would have at the point where this end is in the nadir position of its travel path; when the latter position is reached, the inner end of the riffle will be advanced a certain distance and hence will have caused such inner end to be slightly raised relative to a horizontal plane through the nadir point, thus changing the angularity of the bottom of the groove. As the riffle advances, the angularity characteristics of the groove bottom relative to a horizontal plane thus produced will be generally retained throughout the travel of the groove through the quadrant, thus setting up the conditions that are exemplified by the groove in Figure 10.

Since the bottom $23b$ of the riffle is inclined downwardly, as indicated in Figure 10, it will be understood that the lower or vanishing end of the groove will have a travel path independent and of larger radius than that of the inner end of the groove, thus producing a small difference in the regimen speeds at the opposite ends of the groove 23a; the inclined bottom 23b thus provides for an increasing length of radii in the direction of length of the groove, with the result that the bottom of the groove itself will provide for increasing centrifugal force values in the direction of the disappearing end of the groove. In other words, the centrifugal force value on a particle within the groove will increase as the particle traverses the groove from its inner to its vanishing end.

Another feature in connection with the riffle operation is provided by the specific location of a particular riffle within its travel paths at a particular moment, and brings into the conditions the weight of the particle itself. For instance, a particle within a groove will have its complete weight added to the centrifugal force value when the trailing or disappearing end of the groove passes the nadir point, since the direction of length of the groove is then wholly downward. On the contrary, any particle present in a groove located on the opposite side of a vertical plane through the axis of revolution, would tend to have its weight opposing the centrifugal force value, because the length of the groove is then extending in an upward direction, excepting in a zone in the vicinity of the nadir point, due to the trailing characteristic of the outer disappearing end of the groove. Within the nadir point zone, there is a gradual change in these conditions since the groove is then traversing a zone in which the entrance is with the trailing end of the groove uppermost, while the trailing end becomes lowermost as the groove leaves the zone. This feature is of service, due to the fact that the ore pulp is delivered to the side of the drum which is on the opposite side of a vertical plane through the axis of revolution from that on which the quadrant is located, so that the trailing ends of the groove extend upwardly at such time and tend to cause any content reaching the trailing end to move downwardly within the groove toward the inner end of the groove, a condition which is a part of the preparation period for subjecting the content to the action of the riffles within the quadrant zone. While the specific centrifugal force action present at the particular point where the ore pulp is being supplied to a groove is present at such time, in this location the weight of such content is in more or less opposition to the centrifugal force value, so that the content will readily flow toward such inner end and remain at such end as the groove continues its approach toward the nadir point, the gradually changing conditions through the nadir point zone tending to arrange the content for proper action within the quadrant zone.

On the other hand, a particle carried by a riffle entering the quadrant zone under decreasing speed progression conditions, may be subject to other action than the rejection condition pointed out above. Under these conditions, the particle weight—which remains substantially constant—may serve a different purpose than that in connection with the rejection conditions. While the weight of the particle remains constant, the centrifugal force value which tends to hold the particle within the groove or cause it to be discharged lengthwise of the groove, becomes progressively less as the riffle advances, thus decreasing the difference in value between the force value and the weight of the particle. If this difference is reduced to zero or becomes a growing difference in favor of the weight factor, the weight will becomes dominant; and if this takes place at a point within the quadrant where the riffle has reached one of the upper positions shown in Figure 15, the particle weight will cause the particle to move across the side face of the riffle instead of lengthwise thereof, thus placing the particle in position where it can readily enter a riffle carried by a different face of the same convolution, thus, in fact, serving to advance the particle in the direction of the smaller end of the drum.

In practice it has been found that these two conditions, one of which involves the movement of a particle lengthwise of the groove and the other in which the particle is moved across the length of the inner end zone of the groove, become of great importance in that they produce conditions that are active in classifying and separating the different particles. In such practice the ability to advance the particle or to be rejected through this procedure, provides a regimen characteristic such that it has been found that particles will be rejected under high speed conditions and will advance under low speed conditions with the advancing particles being those which it is desired to separate from the mass of particles carried by the pulp. The infinity of centrifugal force values present at any particular speed adjustment will enable the apparatus to inherently provide the conditions which will permit of a different movement of the particle—to move the particle transversely over the side of the groove instead of lengthwise of the groove—and thus provide the desired selectivity, since particles which do not pass across the groove face in this manner are rejected and passed lengthwise of the groove.

As will be understood, these conditions can be made to apply to particles of different specific gravities through the manual adjustment of the speed. Where the speed rate is decreased, the centrifugal force values of the entire range of centrifugal force values is shifted to a lower speed value range and thus decrease the effect of the centrifugal force on the particle which may be carried by a particular riffle so that a particle of less specific gravity will reach this zone in which the selection as to travel path of the particle is made, while if the adjusted speed is increased, the selection can be made with respect to particles of higher specific gravity.

The front end zone of the drum is provided with an annular casing 51, in which the front wall 51a is spaced from the front large end of the drum and extends inwardly a radial distance such as to provide a central opening to the casing, the radial length of the wall 51a being such that the margin of the opening lies some distance inside of the diameter of the drum at its larger end, so that the casing tends to cover the riffle zone at such end of the drum. The opposite wall 51b of the casing overlies the drum in advance of the track 23, the two walls thus forming a receptacle below the open end of the drum to receive treated pulp material passed through the open end of the drum. The casing is supported on suitable legs 52 carried by the supporting structure 26, the casing being non-rotatable with the drum; the bottom wall 51c of the casing and which forms the bottom of such receptacle, is formed with a discharge opening providing an entrance to a discharge conduit 53, thus providing for practically immediate removal of the material which passes from this end of the drum. As shown in Figure 2, the casing opening thus exposes the central zone of the interior of the drum.

As indicated in Figure 2, the front face of wall 51a carries an elongated strap-like member 54 which is secured to such wall and has an intermediate portion overlying a zone of the casing opening. Member 54 is designed to carry the structure for introducing the pump material into the drum. For convenience in showing the character of such structure, the latter, with member 45, is shown in Figure 1 as displaced from its actual position in order that it may be included within the section of that figure; Figure 2 shows the actual location relative to the axis of the drum.

The delivery structure is in the form of a tubular member 55 of desired length, closed at its outer end and having its inner end formed with openings 55a through the wall of the member and having a guard 55b beyond such openings, the structure at this point being such that pulp material can flow lengthwise of member 55 to its inner end zone where it is free to pass out through the openings 55a, the guard 55b forming a wall which prevents the material from being jetted forward of a desired position, the openings 55a permitting discharge laterally. The outer end of the member is provided with an elongated opening 55c having a guarding flange 55d, the flange and opening forming the entrance to the interior of member 55, the opening flange 55d having dimensions to permit the ready entrance therein of a supply pipe 56 leading from the source of supply of the pulp, not shown. The member 55 is mounted in a bearing 57 carried by member 54, the bearing being internally threaded, member 55 being complementally threaded externally for a suitable distance, the purpose being to permit adjustment of the position of openings 55a relative to the length of the drum. Member 55 has its outer end provided with a wheel 58 by which the member 55 can be rotated so as to provide for such adjustment, it being understood, of course, that pipe 56 is removed during the period of adjustment and that the close of the adjustment leaves the guard 55b as extending upward to permit the re-introduction of pipe 56. This adjustment of the position of member 55 is provided to compensate for differences in the size of the particle content produced by the grinding of the ore material, the member 55 being moved in the direction of the smaller end of the drum as the fineness of the content is increased, and moved toward the larger end of the drum with the content ground to a coarser mesh status.

As indicated in Figure 2, the location of member 55 is such that the material passing through openings 55a will fall upon the riffle zone which is vertically alined with such openings, the material thus passing downward onto the riffle zone materially in advance of the nadir point of the drum. At such time, the trailing portions of the riffles are projecting upwardly, so that material reaching such trailing parts will tend to flow toward the inner ends of the riffle, the material falling in the zone between opposing riffles of adjacent convolutions, tending to move into such trailing portions and thus move toward the inner ends of the riffles. Hence, the arrangement is such as to deliver the major portion of the pulp at such inner ends of the riffles as the latter approach the nadir point to begin entrance into the quadrant heretofore referred to. The amount of pulp which may be delivered per unit of time is, of course, determined by the dimensions of openings 55a, but it will be understood that while the supply is continuous, the amount which is being delivered per unit of time is sufficiently small as to prevent overloading of the riffles, it being understood that the continued movement of the drum causes a constant change in the riffles which are receiving the pulp in this manner; in this connection, the amount of the content of a riffle will probably not be uniform, due to the fact that constantly changing speed conditions are present in the movement of the drum, so that there may be a slight decrease in the amount of a riffle during periods when the drum is rotating at its higher speeds, since a riffle then passes out of the supply zone more rapidly; the difference, however, is small as between such high speed and low speed conditions, the openings 55a being designed to permit feed of the material without overloading the riffles during the slow speed conditions.

When the falling pulp comes into contact with the drum, the radius and speed factors that are provided by the drum rotation immediately become active to set up the centrifugal force effects which the apparatus is designed to produce. Since member 55 is located at a distance preceding the arrival of a riffle at the nadir point, it will be understood that the pulp content which may be contained within a riffle so supplied will be subjected to centrifugal force activity prior to the arrival of the riffle at such nadir point.

For instance, assume that the pulp material is being supplied to the riffle which reaches the nadir point simultaneously as cam 42 reaches its high point. In such case, the riffle will approach the nadir point under conditions of an increasing progression so that the centrifugal force values will be approaching those present at the instant of change in progression provided by the cam, these values being indicated by the line c in Figure 14 of the particular band which presents the activities of the riffles of the particular convolution to which the pulp is being delivered. During this approach, it is apparent that not only will the pulp material tend to move in the direction of the inner end of the riffle—due to the upward inclination of the trailing portion of the groove—but will, at the same time, subject the pulp content to the effects set up by these increasing centrifugal force values.

Since the pulp is made up of the comminuted ground material, and the water added to produce the pulp characteristic, it will be understood that the content of the riffle will be made up of particles of various specific gravity values as well as fine dust particles, etc.—these latter tending to produce the "slimes" effect that is present. Hence, it can be understood that there will be a tendency of the heavier particles to move downward in the mass, due to the increased centrifugal force value that is produced by the increased weight of the particle. Hence, as the riffle is advancing, the tendency is for these particles to move toward the bottom of the riffle, so that as the riffle reaches the nadir point, there will have been a tendency to stratify the various members of the pulp contained within the riffle. This stratification trend is not completed during the approach but is completed during the movement or travel through the quadrant, under conditions presently explained.

On the other hand, should the riffle receiving the pulp content be one which reaches the nadir zone as cam 42 reaches its low point, the approach of the riffle to the nadir point will be under conditions of a decreasing speed progression, under which the centrifugal force values will be decreasing so that the riffle is reaching the nadir point under minimum centrifugal force values and the travel through the quadrant is on the basis of an increasing progression. Under such conditions, the stratification trend referred to would be less pronounced in such action and would be enhanced through the fact that the travel through the quadrant is under increasing centrifugal force values. Referring to Figure 14, the conditions would approximate those represented by line b of the band which represents this particular convolution.

Obviously, intermediate riffles will pass through such preparation zone under the particular conditions that are provided by the location of the riffle between these extremes, the character of which will be understood from the previous description.

As heretofore pointed out, the trailing portion of the riffles extends upwardly at the point where the pulp is delivered to the riffles, so that while the pulp content becomes subject to the centrifugal force value of a riffle, the force is exerted in a direction practically transverse to the direction of gravitation, so that the pulp content will tend to gravitate toward the inner end of the groove as the drum advances the riffle during the approach of the riffle to the nadir point position; hence, the tendency to set up stratification initially is through the combined action of centrifugal force and gravitation, the angularity of these forces relative to each other being gradually reduced as the riffle advances until, at the nadir point, the two forces coincide in direction, thus tending to aid in producing the stratification trend within the pulp content during this period. In addition, the trailing portion of the groove and its relation to the inner end of the groove becomes changed during this period since the riffle is then approaching the nadir point so that the bottom of the groove will gradually reach a horizontal status and then gradually develop the inclined effect shown, for instance in Figure 10, with the trailing end below the inner end of the groove, this development being followed by the gradual change in inclination of the bottom of the groove produced as the riffle passes into the quadrant zone with its inherent upward rise of the inner end of the groove in following the curvature of the arc provided by the quadrant. In this latter stage, gravitation cooperates with the centrifugal force, but the coincidental condition present at the nadir point is changed to a gradually increasing variation in the two forces, with a material distinction between the conditions on the opposite sides of a vertical plane through the nadir point, due to the fact that within the quadrant zone the direction of length of a groove extends downwardly with the inclination value increasing as the riffle advances through the quadrant.

Due to these conditions, the stratification trend which began in the approach zone to the nadir point is continued as the riffle proceeds, with the rapidity of development of the stratification trend depending upon the particular speed conditions which may be present during the travel of the riffle through the quadrant. If the riffle reaches the nadir point concurrently with the high point activity of cam 42, the centrifugal force values within the quadrant will gradually decrease and thus tend to slow the stratifying trend action; on the other hand, if the riffle reaches the nadir point concurrently with the low point of cam 42, the travel of the riffle through the quadrant will be under an increasing progression of centrifugal force values and thus tending to increase the stratification trend action, in which case there will be a greater tendency for the heavier particles to reach the bottom of the groove and become subject to the increasing centrifgual force values which are produced by the downward inclination of the length of the groove, so that such particles would inherently tend to travel toward the trailing end and thus lengthwise of the groove, and as a result, set up the particle rejection action previously pointed out, the rejected matter moving out of the riffle and into the intermediate space between convolutions, which space is comparatively smooth in surface, so that such rejected content can move downwardly within this space toward the bottom of the drum. It is possible that the heavier particles would be discharged from the riffle at such speeds as to tend to throw them into riffles of the adjacent convolution, or even over the apex of such adjacent convolution, the movement being in the direction of the larger end of the drum; in such case, the rejected particles would be taken away from the convolution which is forming the initial zone of action, and be subject to the conditions set up by the adjacent convolution.

Since the eccentric mounting of the drum sets up differences in radial length as between adjacent riffles or riffle zones—the difference being least in adjacent riffles and greatest between the zenith and nadir riffles when the drum axis is vertically alined with the axis of revolution—it will be understood that the action as between two riffles must necessarily differ as to timing. In other words, adjacent riffles will reach the nadir zone at slightly different positions of cam 42, so that the high point of the cam which is used as one of the illustrative controls in the above description would be active on one riffle and then continue its advance, so that the succeeding riffle would reach the nadir point after the high point of the cam has passed its highest position, this difference being progressively developed as riffle follows riffle in reaching the nadir point, and reaching its maximum when the riffle opposite the first named riffle at the time the latter reaches the nadir point, itself reaches the nadir point, the differences between these two riffles representing the effects set up through the eccentricity of the drum. As the drum movement continues, the progression thus indicated is reversed. As a result, the action within the quadrant zone inherently differs with each of the riffles of each half of the drum.

The stratification trend referred to is not a true and complete stratification, as will be understood from the fact that while the cross section at the inner end of a riffle is small with respect to the apparatus or even to portions of the apparatus, yet the cross section is large with respect to the particles contained within the pulp, so that the content of such inner end generally includes a number of such particles, these being made up of the ground material and which includes metallic as well as stone material and possibly dirt particles. These particles may differ not only as to dimension, but more particularly as to specific gravity values, although the smallness of the particles renders the difference in such values as being very minute. However, being solid as compared with the flowable form of the pulp, each particle has its individual effect with respect to the centrifugal force values which may be present in the riffle. Presumably, particles having the same specific gravity characteristics would be movable within the pulp at substantially similar rates under the centrifugal force effect, while heavier particles would move through the pulp at a more rapid rate, due to the fact that their specific gravity value is greater with respect to the flowable portion than that of particles of lower specific gravity. Hence, there would tend to be particle movements which differed as to rate when traveling through the pulp, this action tending to set up the stratifying characteristics referred to, since the heavier particles would probably reach the bottom of the groove in advance of the less weightier particles; the weightier particles may thus tend to pre-empt space conditions within the bottom zone of the groove and in such case would tend to prevent the less weighty particles from reaching the bottom, the latter being unable to displace the heavier particles. Where the heavier particles are rejected by passing lengthwise of the groove, the less weightier particles are then able to advance.

While the walls of the groove move bodily within the circular path and thus move as a unit, such movements conform to the conditions based on the length of the radii which are present within the groove. For instance, the radius length at the inner edge of a side of the groove is less than the radius length at the bottom of the groove, the difference in such lengths being represented by the depth of the groove; the arc through which such inner edge advances through the quadrant will therefore be slightly less in length than that through which the bottom of the groove passes. However, since the wall of the groove structure is unitary, this provides no appreciable effect within the groove.

However, while a content within the groove or riffle would present the same conditions as to the length of radii, the fact that such content is not only flowable but is made up of particles differing in specific gravity values, may produce a slightly different effect from that produced with respect to the walls of the groove. Since the particles are movable through the pulp, there may be a slight creeping effect as to particles brought about by this difference in length of radii at different portions of the groove. For instance, a particle which is positioned at the mouth of the groove, when moving downward within the groove under the centrifugal force value effect, is actually passing into a portion of the groove which is traveling through a slightly increased distance and thus at a slightly increased speed—the difference is very minute, but by comparing two particles which are brought into contact during such movement through the pulp in the downward direction. Since the lower one of the two is traveling under the longer radius length, its speed would be slightly greater than that of the other particle traveling under less radius length condition; the difference in this respect will possibly be imperceptible, but the trend is present and has its effect where the two particles have the same specific gravity values, since the slightest relative movement between the two laterally can tend to more completely set up the conditions known as the coefficient of friction. In other words, the two particles, both subject to centrifugal force conditions, may have the slight lateral movement needed to bring about a more perfect surface contact of the two and thus aid in developing the friction condition that is especially beneficial during the concentration activities of the device as more particularly pointed out hereinafter.

The assembly thus far described presents a number of characteristic features. Among these is the fact that each of the convolutions of the scroll riffle practically forms an individual zone of operations. For instance, it is possible that in the rejection from a riffle, one or more of the particles which would not in itself have been rejected, will pass out with the pulp content. This would then pass to the bottom unless the rejection has been with a force sufficient to carry it over the ridge of the succeeding convolution, in which case, the particle would be active with a different convolution until it is again advanced, whereupon it would then again have its activity within the former convolution.

Since each riffle actually traverses a circular path, the eccentric mounting of the drum sets up the condition that while each riffle has such circular path of travel, yet the values produced during the travel in the path and which combine to produce centrifugal force activity differ to a slight degree from those of adjacent riffles. While all of the riffles partake of the constant variation in speed conditions produced through the action of cam 42, the arrangement is such that the centrifugal force values effective within a riffle differ from those of adjacent riffles to a very slight extent, due to the eccentric mounting of the drum, the differences increasing when the riffles being compared are located more remotely from one another within the convolution. Hence, the zone provided by the convolution presents a large number of centrifugal force values which become active upon the content of the riffles while passing through the quadrant.

There is no fixed regimen provided for a particle within such convolution zone; this is due to the fact that the question of which riffle may be in the path of the delivered pulp is a matter of chance, and since there is this constant variation in centrifugal force values present as between riffles, it is possible that a particle may be located within the zone for but a short time or for a lengthy time. It may be noted that in extensive tests made over extended periods, it has been found that each of the desired particles, at some time or other, during the operation, reaches the upper limits of the quadrant and is advanced; this result may require extended periods, but the operation of the apparatus is such as to bring about this result.

The above characteristic is present with each of the convolution zones, but although the drum carries the convolution riffles in similar manner to that above referred to, the difference in values, due to the fact that the convolution itself is based upon a different diameter of the drum, thus producing the condition that convolutions toward the smaller end of the drum have centrifugal force values lowered, while the convolutions toward the larger end of the drum have these values increased. The difference between the values of adjacent convolutions may be small so that there may be an overlapping of centrifugal force values as between adjacent convolutions; this is referred to above in connection with Figure 14 in the presence of overlapping bands. This overlapping of values is provided for the reason that when a particle has passed from one convolution to another, it becomes subject to the same general regimen conditions that are found in connection with each of the convolutions and hence there is a need for the presence of possible duplication of values. It will be understood, of course, that a riffle of one convolution which may be alined with a riffle of an adjacent convolution will not present exactly the same centrifugal force value in both convolutions at the same time; the overlapping of values comes from the presence of riffles that are out of alinement in the direction of length of the drum, since the difference in diameter of the drum produces the limiting factors so that a riffle alined differently would be required to produce the overlapping value relationship.

As a result, the drum convolutions present a great multiplicity of centrifugal force values which vary practically constantly with each of the riffles, due to the fact that the drum revolution in its path is being subjected to the action of cam 42, the shape of the latter producing a constant change in the conditions relative to belt 35 and hence a change in the speed of movement of the drum about the axis of revolution. These variations, except as to the minute specific differences in centrifugal values, are common with each of the convolution zones and the riffles of each zone, the result being that the particle content of the pulp becomes subject to many testing operations with respect to centrifugal force values differing one from another, tests which may take a short or a long period of time, but, in the end, the particle of desired value will reach a riffle of the zone which will serve to advance it to the succeeding zone; many rejections may take place during the tests, but, in the end, the tests with respect to such zone come to an end by the fact that the particle reaches the point where it is favorably located to advance into the succeeding zone.

In addition to the provisions for creating the centrifugal force values above explained, the apparatus includes controllable means for admitting water to the interior of the drum while the latter is in operation. As will be understood, the pulp originally introduced contains a water content which permits the flowability of the material comprised in the pulp. Since the water content thus introduced is also subject to centrifugal force conditions, it can be understood that there would be a tendency for this water content to be gradually eliminated through gravity and the centrifugal force action, thus tending to render the pulp less mobile as the water is passed from the pulp. To retain such mobility, provision is made to introduce a new supply of water to the interior of the drum so that the flowable pulp characteristic will be maintained. However, this addition tends to render the pulp characteristic of a cleaner type, since the removal of the liquid will also tend to remove what are known as the slimes produced by the dirt and similar content of the pulp—since the added water is free of such slime-component conditions, the pulp becomes clearer and cleaner.

Figure 15:
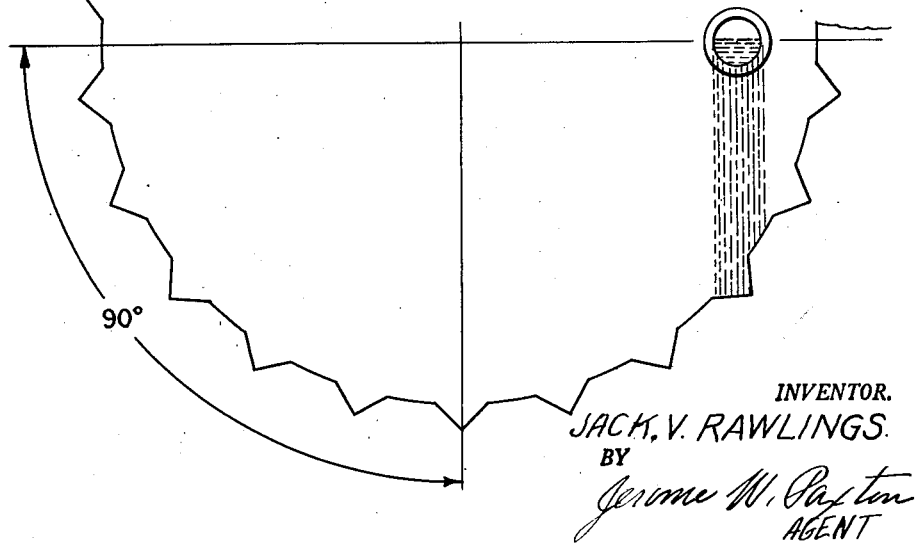
Figure 15 is a schematic diagrammatic view of a drum segment and showing characteristics of the riffle grooves of such segment; the view being designed more particularly to illustrate the relationship in angularity of the sides of the riffle grooves when passing toward and through the active quadrant of the drum.

In addition, this water supply also serves to arrest the length of movement of the riffle-borne content so as to confine the active action of the apparatus to the zone above indicated as the quadrant. At the 90 degree angle, the sides of the grooves incline downwardly, as indicated in Figure 15, so that the introduction of the water will cause the content of the riffle to readily move out of the riffle over the lower side of the groove so that further upward travel of the content will be arrested, even though such content be under centrifugal force activity at the time.

In addition to the above, the water delivery apparatus is so arranged as to tend to aid in the advance of particles from one convolution to the next, by causing the water to be delivered in a path that is inclined forwardly toward the bottom or nadir point of the drum, so that there is a tendency to cause particles moving over the side of the groove to move in a direction toward the advance convolution.

As shown in Figure 4, the hollow drum shaft 30 is provided internally with a hollow shaft 59 which is coaxial with and of greater length than said shaft 30, shafts 30 and 59 being suitably supported and capable of independent movement about their axes. The ends of shaft 59 are closed by suitable end walls 60 and 60a, these walls being adapted to support a group of pipes 61—three in number—which extend beyond both of such end walls, the pipes being arranged more or less symmetrically with respect to the axis of shaft 59. As presently explained, the rear ends of pipes 61 are controllably connected with a source of water supply, while the portions of the pipes in front of end wall 60a project into the interior of the drum, the length of projection differing with the three pipes, as indicated in Figure 1. Each of the pipes includes a portion which extends laterally and then forwardly to produce a nozzle-carrying section 61a of a desired length. These sections 61a are designed to extend in alinement toward the large end of the drum, and since the pipes 61 leave end wall 60a at different points, the laterally extending portions may extend at different angles in order to bring the sections 61a into the desired alinement, the latter being indicated in Figure 5 with the alinement more or less parallel with the conical wall of the drum as shown in full lines in such figure.

Each of sections 61a carries a plurality of nozzles 62. As indicated, each nozzle has a generally triangular contour at its discharge end with a stem section 62a threaded to permit ready mounting on its section 61a. The triangular portion of the body of the nozzle includes an open-ended casing 63 of triangular contour on the face, and is of decreasing dimensions away from such face to an intermediate point which presents a perforated diaphragm structure 64 which separates a chamber 62b of the stem from the interior of the casing 63, such interior end of the chamber being connected by one or more perforations 64a.

65 indicates a member located within the interior of casing 63, said member having its contour triangular, with the bottom wall located on the bottom wall of the casing, but with the sides of the triangle spaced from the interior of the corresponding sides of the casing; the face of these sides of the member extend in parallelism with the corresponding sides of the casing. This spacing permits of the delivery of water from the interior of the casing through the front of the nozzle in the form of a stream, the outlines of which are practically an inverted V, the bottom being closed through the contact of the bottom of the member with the bottom of the casing. Member 65 is designed to be adjustably mounted for longitudinal movement within the casing by means of a threaded element 66 extending through the member and adapted to be threaded into an opening carried by diaphragm 64 as shown more particularly in Figure 6. Threading of the element 66 causes the member 65 to move inward within the casing and thus decrease the width of the space between the member and the casing; the characteristics of the discharge of water through the nozzle can therefore be accurately provided so as to meet any desired conditions.

A plurality of nozzles 62 are carried by each of the sections 61a, as indicated in Figure 5 so that an adequate supply of water can be provided practically throughout the length of the drum.

The system of sections 61a is given an oscillatory movement relative to the convolutions through the pipes 61 mounted within the ends 60 and 60a.

The end wall 60 is shown as provided with a radially extending arm 67, as indicated in Figure 3. The pulley 47 which rotates cam 42 carries a pin 68, which serves as a crank pin and moves in a rotary path by the movement of the pulley; the pin 68 is mounted in the peripheral zone of the pulley, and hence moves through a path of considerable diameter. The crank pin 68 and the free end of arm 67 are operatively connected by a connecting rod or member 69 as indicated in Figures 3 and 4. As a result, the movement of the pin 68 through its path causes the rod 69 to draw upon arm 67 during a half revolution of the pulley and serves to push the member 69 when the pin is traveling through the other half of the revolution. As a result, the arm 67 is swung through an arc of approximately 90 degrees, first in one direction and then in the opposite direction, thus oscillating the end wall 60 and through the latter the shaft 59, such oscillations necessarily providing similar movement to the pipes 61 and the sections 61a carried thereby. If one of the extremes of oscillation places the section 61a at the upper end of the quadrant heretofore referred to, it is apparent that the opposite extreme will place the sections as approximately on the vertical plane through the axis of revolution and hence with the nozzles 62 practically facing the nadir point of the drum, the range of oscillation thus covering the quadrant zone which forms the active zone of the classifying, concentrating and separating action of the apparatus. It will be understood that during such oscillatory movements, the nozzles will continually face the scroll riffle formations, and thus direct the water content of the nozzles directly toward the quadrant zone with the water delivered into contact with the particular portion of the quadrant within which the sections 61a may be located in the oscillatory path.

Since one end of the connecting rod 69 travels in a circular path while the other end of the rod swings in an arcuate path which is but a segment of a circular path, it is apparent that the end zones of the arcuate path will be traversed at reducing speeds so that the change in direction of oscillation of the arm 67 will not be under jarring effects but will have the normal action that is set up in the nadir and zenith zones of the travel path of the crank pin 68.

Since pulley 47 rotates at uniform speed—the value of which may be adjusted through the adjusting mechanism 50—the sections 61a will also oscillate at speeds produced by such uniform speed. Since the oscillations provide movement in opposite directions, while the drum travels in a single direction of movement, it will be understood, that the oscillation in the downward direction will take place while the drum convolutions are traveling upwardly—thus providing the movements of these two elements in opposite directions, with the result that the time length of contact of the water with a riffle or riffle zone during this period will be comparatively short, due to the opposing directions of travel. On the contrary, during the oscillations of the sections upwardly, the sections are traveling in the same direction as the drum. Hence, the length of water contact with a riffle zone will be greatly increased. And since the oscillating speed is with a uniform regimen, it will be understood that the speed variations provided in the drum movement by cam 42 do not affect the delivery of the water through the nozzles, but can affect the time during which a nozzle may be active upon a particular zone, since slower speed of the drum will reduce the speed differential between the sections and the drum during the downward oscillation and prolong the time of contact during the upward oscillation.

The oscillating mechanism thus far described would oscillate the sections 61a in the plane of a circular path extending normal to the axis of rotation. However, in practice, the oscillation is not in such plane, but is angular to such plane as indicated by arrow y in Figure 5. This result is produced by the use of a cam 70 which is supported by one of the bearings which supports shaft 30, the cam thus remaining stationary. The cam 70 is provided with a pair of opposed faces 70a which lead in opposite directions, with the two faces being adapted to coact with a pair of pins 71 oppositely disposed on shaft 59. As shaft 59 is oscillated, the two pins carried thereby move over the respective faces 70a, this movement of the pins serving to draw the shaft 59 first in one direction and then in the opposite direction, two pins being utilized for convenience, one pin serving to force the shaft movement in one direction, with the other pin riding over the other face, the latter pin then becoming active to force the return movement of the shaft. Since faces 70a are inclined it is apparent that during the period of one of the oscillations of the shaft, the appropriate pin will cause a gradual movement of the shaft in the direction of its axis, thus providing the direction of movement indicated by arrow y; during the other oscillation, the opposite pin serves to gradually shift the shaft in the opposite direction, so that during this oscillation the sections 61a are returned over the same path, thus returning the sections to the initial position at the top extreme of the quadrant. Hence, the sections 61a, during their downward movement will traverse a path leading in the direction of the smaller end of the drum, while during the opposite oscillation, the path will lead in the direction of the larger end of the drum.

Consequently, during the downward oscillation of the sections—during which they are moving in a direction opposite to the direction of drum movement—the streams delivered by the nozzles 62 are advancing in a direction such as to move riffle content toward the adjacent convolution located on the side toward the smaller end of the drum, and thus tend to aid in advancing any particles within the riffle in this direction. During the reverse oscillation—during which both the sections and the drum are moving in the same direction—the time the streams remain active with a riffle is materially increased, so that during the stroke which represents this oscillation, the streams will almost follow the riffle, the difference in speed between the sections and that provided by the drum being greatly reduced. As a result, the operation will nearly approximate a condition in which practically all of the riffles will be subject to a similar action; this would be due to the fact that during the return, the streams would be centered within a small area of the drum while this area was traversing the quadrant, so that when the sections 61a begin their succeeding downward movement, they are cooperating with riffles which were positioned in the nadir zone during the previous downward stroke; hence, the apparatus will tend to provide this action with practically all the riffles, although the cycle of section movements includes their movements in opposite directions.

There will be variations in this respect due to the constant variation in speed of the drum, and also, through the adjustment by the mechanism 50, but the variations in this respect are comparatively small, so that this treatment of the riffles above referred to will approach constancy with respect to the riffles of the drum.

The rear ends of pipes 61 are individually connected to a control station 72, being connected with pipes 61 by flexible connections to compensate for the axial movement of shaft 59. The control station includes a valve for each of the pipes, so that the liquid supply to each pipe can be individually controlled. The water supply for the station 72 is provided by a pump 73 carried by supporting structure 26, the pump having suitable connection with the valve structures of the station. As indicated in Figures 3 and 4, the pump is driven by a belt connection with a pulley 74 mounted on shaft 30, so that the pumping operation tends to have the characteristics provided by the drive of shaft 30; however, the arrangement is such that the pump 73, even under the minimum speed conditions, will provide an adequate supply of water to the valves en route to the pipes 61.

As will be understood, the movement of shaft 59 in the direction of its axis necessarily carries with it the end wall 60, thus affecting the position of the connecting rod or member 65. However, since the latter is freely mounted on crank pin 68, it will be understood that the rod can have the necessary movement on pin 68 to compensate for this movement of shaft 59.

As with the larger end of the drum, the smaller end is also provided with an annular casing 75 of a somewhat similar type to the of casing 51, being designed to collect the products discharged from the smaller end of the drum. Casing 75 carries a discharge outlet 76. This arrangement permits the collection and discharge of different products which have been separated by the operation of the unit. This condition is of especial value where the ores are of a complex type and it is desired to provide for separation of the indivdual ore values. For instance, in Figure 12 is shown a system especially designed for producing the latter result, the system shown including three individual units each of the type herein disclosed, these being indicated as units A, B and C. Since each of the units has the characteristics of the unit described above, including the individual adjusting structures, it is apparent that either could be used as a single unit or that either or both of the additional units can be coupled operatively with the main unit A by simply employing the discharge conduit 53 and/or discharge conduit 76 as supply pipes for the units B and/or C, these conduits, in such case, performing the functions of pipe 56 of the main unit as supply sources for the additional units. In such case, it would be possible, for instance, to provide the action of unit A in such manner that the products received in casing 75 would be made up of two different metallic values with other values received in casing 51; the values from casing 75 would then be treated by the cylinder C to provide the separation as between the two values, one of these values emerging through conduit 53 and the other through conduit 76 of unit C, it being obvious that similar results would be obtained in connection with the products which would be discharged from unit A through conduit 53. Obviously, to produce these classifications and separations, the different units would have different adjustments, as presently indicated, since each unit is adjusted to bring about a particular product within the casing 75, and a unit requires practically an individual type of adjustment in order to produce this result, as presently explained.

Since ore material takes on many and varied different forms, it is apparent that provision should be made for meeting, as far as possible, the specific nature of a particular ore through control of the unit operation. Many of these have been pointed out above and will be amplified hereinafter, but one of the methods employed for aiding in this respect is that which provides for a change with respect to the axis of revolution. As is apparent, if such axis be shifted from the horizontal to an upwardly inclined direction, the unit will operate as before, but the nadir zone of the drum will then extend at a less angular value to the horizontal than is disclosed, for instance, in Figure 1, with the remainder of the drum being varied from the position shown in said figure, due to the shifting of the axis of revolution; a change such as this would permit the ore being treated to advance more rapidly toward the smaller end of the drum.

To permit this change, the unit provides for rocking the supporting structure 26 about a hinging pivot point located in the end zone of the unit adjacent the smaller end of the drum, the entire supporting structure 26 being bodily movable about such hinging pivot so as to raise the larger end of the drum the desired distance; since all of the unit structure heretofore described is carried by the structure 26, it will be understood that the unit action remains as before, with the single exception of permitting a freer advance of the material in the direction of the smaller end of the drum.

To provide such vertical adjustment of structure 26, the supporting frame located in the zone at the larger end of the drum is provided with a vertically movable rack 77 cooperative with a pinion 78, the rack extending vertically and underlying an end zone of the supporting structure 26, the pinion having its axis located at a fixed point relative to the leg 79 of the frame, the rack moving vertically relative to such leg. Since raising movement involves the entire weight of the unit, it will be understood that the power required to provide the raising movement is considerable. This may be provided in suitable manner, as by the use of gearing—which may be hand or power operated—the gearing including a gear 80 carried by the shaft of pinion 78, a suitable latch member 81 cooperating with the gear to prevent accidental retrograde movement of the gear from its adjusted position due to the weight of the unit. The hinge used for the support is indicated at 82.

In the above description, reference is made to changing speed conditions in operation which are more or less illustrative, being based on the particular dimensions of certain of the parts shown in the drawings. For instance, the relative speeds of drum shaft 30 and drive shaft 32 under the action of cam 42 are indicated as ranging between 2:1 and 4:1, this being the range provided by the changes in position of drive belt 35 under the action of the cam 42. Since the range itself is controlled by the positions of the pins 36a and 36b, it will be understood that by adjusting the positions of the pins so as to vary the projected length of one or both pins, this range may be varied as may be found desirable without change in cam 42 itself, since the active position of the belt 35 depends upon the amount of actual throw which can be provided by the cam. Hence, the relative speeds of these two shafts is more or less subject to control, depending somewhat upon the nature of the ore which is undergoing treatment, it being possible to adjust the pin or pins whenever the unit is at rest. Likewise, the speed relationships set forth between pulley 47 and adjustable pulley 45 are illustrative only, it being readily understood that the range control can be readily varied in obvious ways.

It will also be understood that while Figure 10, for instance, illustrates a particular angularity of the bottom 23b of a groove in a horizontal plane, that such specific angularity is more or less individual to a particular convolution of the scroll riffle. As heretofore pointed out, the width of a convolution increases toward the smaller end of the drum as shown in Figures 1 and 5, the increase in width being generally accompanied by decrease in the depth through the apex of the triangular formation, thus changing the angularity of the sides of the triangular formation. In addition to these differences, the depth characteristics of the groove are also varied, the angularity of the bottom of the groove tending more toward the horizontal in the convolutions toward the smaller end of the drum. These characteristics of the convolutions vary in the direction of length of the drum, being major at the large end of the drum and minor at the small end, the cross section of a convolution at the larger end presenting the sides of the convolution as of materially greater acute angle to each other than are the similar sides of the convolution at the smaller end. Obviously, this change in the angularity of the bottom of the groove has an effect so far as centrifugal force action of the grooves of the respective convolutions is concerned, since the grooves at the larger end have a materially greater difference as to radius length between the inner and the vanishing end of the groove than is the case with the grooves of a convolution at the smaller end, the results being that the centrifugal force value variations as between the inner and outer ends of the groove are greatest at the convolutions at the larger end of the drum, with such variations adapted to increase the centrifugal force value, as heretofore pointed out.

In effect, the unit may be said to be operating practically on a "process of elimination" basis. Since the initial pulp content includes not only the metallic values which are presumably released through the grinding of the ore material, but also other materials such as stone, dirt, etc., so that it becomes necessary to eliminate the undesired portions of the content. This is done through the actions of the scroll riffle, these undesired portions of the pulp being gradually rejected through the centrifugal force and water spray action; as pointed out, the pulp is initially admitted at an intermediate point in the length of the drum with the scroll riffle so arranged as to increase the centrifugal force values toward the larger end of the drum and at the same time provide for a readier passage of rejected material from the immediate scene of action, thus providing definitely for the elimination of the undesired material in a direction away from that in which the desired particles are designed to travel, thus initially separating the pulp content as between desired and undesired particles, this being done through the effects produced in the travel of the riffles through the quadrant as above explained.

As heretofore pointed out, there is no set regimen with respect to either the desired or undesired particles so far as their travel through the unit is concerned, since a metallic particle may begin its travel toward the smaller end of the drum early in the drum operation or it may not provide the advance for a considerable time, but it has been found in practice that the desired metallic particles will be carried forward to the smaller end while the undesired particles will travel toward the larger end of the drum and be discharged through that end of the drum. It is not possible to trace the activities of any single particle or even a group of particles, due to the fact that during passage into and through the quadrant zone, particles may be temporarily rejected and thus not advanced, or it is possible that a particle of the desired type may form a part of the pulp which enters a riffle under conditions that are most favorable for the classifying of this particular value relative to other values, and thus be carried through the quadrant in the most favorable conditions for the classifying action. It is believed that during the operation of the unit, each of the desired particles will, at some time, have reached and be exposed in the upper zone of the quadrant and then advanced toward the smaller end of the drum as a result; whether this takes place early or late cannot be predetermined being dependent upon the conditions under which the particle is being advanced through the arcuate zone, which conditions vary as above pointed out.

The particles which are advanced as a result of the travel within the zone—the advance being in the direction toward the smaller end of the drum—move to a convolution in which the factors above referred to are slightly changed. This is due to the fact that such convolution is located in a zone of the drum of reduced diameter so that the length of the radius from the axis of revolution is slightly decreased; there is, of course, a slight decrease in the angular length of the quadrant due to the conical shape of the drum, so that the peripheral distance to be traversed by the convolution within the quadrant is slightly less. Since the time period during which a riffle traverses the arcuate zone is similar throughout the length of the drum, it will be understood that the peripheral speed of the new convolution is slightly less than that of the convolution from which the particle has passed, the result being that the centrifugal force values of the new convolution are slightly less than those of the previous convolution. In addition, the groove depth of a riffle is slightly less steep, so that the possibilities of rejection of the particle from the new convolution are decreased.

This development is of advantage through the fact that the content reaching the new convolution has been, at least, partially classified and separated through the action of the elimination provided in the previous convolution. Hence, the content within the new convolution is more nearly that which is desired in the operation, so that the need for the fine elimination action in the preceding convolution is not as great; however, should there be stray particles of the undesired type carried forward, the new convolution offers an opportunity for its rejection and the beginning of travel toward the larger end of the drum. This latter characteristic remains present throughout the succeeding convolutions in the direction of the smaller end of the drum—there is a constant decrease in the centrifugal force values within the series of convolutions, but inasmuch as the particular specific gravity of the undesired particle is greater than that which is desired, the same conditions will be present in each of the convolutions should the unwanted particle advance as a stray toward the smaller end, so that the process of elimination that forms an essential factor of the invention is not limited to its action with the particular convolution or convolutions onto which the pulp is first received, since the arrangement is such that the same conditions may become active in any of the succeeding convolutions into which the heavier particle may stray.

Since the particle advance is generally of the specific type of particles that are desired, it will be apparent that there is a tendency for the particles to accumulate in riffles, due to the similarity in action had by the particles of similar specific gravity value. There is no amalgamation of particles under such conditions since the operation is not one which involves a chemical characteristic, but there is provided a tendency to develop coefficient of friction activity between particles thus accumulated, thus producing a particle of larger dimensions which then continues its advance under the new conditions. Such accumulations may even produce a particle dimension sufficient to withstand the action of the jets from the water nozzles, thus assuring that they would be carried toward the top of the zone where the increased weight of the particle will cause it to move out of the riffle over the side thereof and thus in the direction of advance. In this manner, concentration of particles is obtained, until the product reaches the smaller end of the drum and passes out through its open end, the particle product being of the desired type.

This action is also present where the ore undergoing treatment is of a complex type, so that it may be necessary to provide a "rough" separation which includes, for instance, two distinct mineral values. It will be apparent, that if the speeds of the apparatus be so adjusted as to properly operate in connection with the heavier of the pair of mineral values, the value of less weight will not be rejected but will advance with the heavier particle toward the smaller end of the drum, so that the advancing particles are then made up of the two metallic values. The separation between the particles of the pair of values is then made by the use of a succeeding unit as indicated in Figure 12, in which the speeds are set to meet the conditions of the weight of the particles of smaller value, so that these would then advance while those of heavier weight would be found as rejected particles and thus provide the desired separation between the respective values.

From the above it will be understood that while the operation appears to be more or less of a mechanical type, it is, in fact, an operation which involves natural physical characteristics in the form of centrifugal force values and the coefficient of friction activities. Unlike the chemical treatment of ore products, there is no material structural change in the particles other than those produced by the grinding of the material into its pulping form.

While I have herein shown and described a preferred form of the invention, including the unit structure and also the method of producing the classifying, concentrating and separating of the metallic values contained within the initial ore pulp, it will be understood that the disclosure is more or less illustrative in type, and that changes and/or modifications therein may be found desirable or essential in meeting the exigencies of service or the desires of individual users; I therefore reserve the right to make any and all such changes and/or modifications therein as may be found so desirable or essential insofar as the same may fall within the spirit and scope of the invention as expressed in the accompanying claims, when broadly construed.

I claim:

1. An apparatus for the classification, concentration and separation of metal ore particles comprising a conical drum open at each end thereof, means to support said drum with its axis approximately horizontal and extending parallel to and in proximity to an axis of rotation, a scroll riffle on the inner face of the drum leading from one end of the drum to the opposite end thereof, each convolution of the scroll riffle being of substantially triangular cross section, the angularity of the side faces of each convolution decreasing successively from the larger end to the smaller end of the drum with each side face carrying an individual riffle, the riffles merging with the apex and terminating short of the end of the base of the triangular cross section, means operative to move the drum in a circular path about the axis of rotation to cause each riffle of a scroll convolution to travel in a circular path with the travel paths of adjacent riffles differing slightly in radius dimension relative to the axis of rotation to thus produce varied centrifugal force values within a convolution during movement of the drum, the said means to move the drum being controllable to provide drum advancing movements in its path of movement to accord with a predetermined speed cycler development in which the speed of advance varies continuously within definite range limits to cause the centrifugal force values of a riffle to be varied during the progression of a riffle in its path of travel about the axis of rotation so that said riffles will provide a multitude of centrifugal force values differing relatively as to active values during drum movement in its path with the differences of minute variation within a limiting range determined by the drum movements within its path of movement, and further means to deliver pulp material to a lower zone of the scroll in advance of a vertical plane through the axis of rotation to thereby deliver the pulp to the nadir point of the drum revolution path by scroll riffle advance and to advance the pulp upwardly within a limited arcuate path defining a zone extending from the nadir point and with the limit of such zone extending through an angular distance of approximately 90 degrees, the said last mentioned zone constituting the portion of the drum travel path active in the classifying, concentrating and separating activities of the apparatus.

2. An apparatus as defined in and claimed by claim 1, further characterized in that the riffles of a side face are spaced apart and positioned in alternation with those of the other side face.

3. An apparatus as defined in and claimed by claim 1 further characterized in that the riffles of a convolution are in the form of grooves of inverted V-shape with the bottom of the groove extending on an angle to the cross-section base less than the angle of the side face by which it is carried to thereby provide a groove length decreasing in depth from its apex end to its outer end.

4. An apparatus as in claim 3 characterized in that the direction of length of a groove extends from the apex end in a trailing direction with respect to the direction of advance of the apex end.

5. An apparatus as claimed in claim 4 wherein the groove length from the apex end extends in trailing direction at an angle of approximately 45 degrees to the direction of length of the apex of the convolution.

6. An apparatus for the classification, concentration and separation of metal ore particles comprising a conical drum open at each end thereof, means to support the drum with its axis approximately horizontal and extending parallel to and in proximity to an axis of rotation, a drum shaft axially alined with the axis of rotation, a scroll riffle on the inner face of the drum leading from one end of the drum to the opposite end thereof, each convolution of the scroll riffle being of substantially triangular cross section, the angularity of the side faces of each convolution decreasing successively from the larger end to the smaller end of the drum, a power driven drive shaft in spaced relationship to the drum shaft, a pulley on the drum and drive shafts, a belt trained over said pulleys, the pulley on the drive shaft being defined by two sections having internal side faces angular to each other, one of the sections being fixed to the shaft for movement therewith while the other section is freely rotatable and movable axially on the drive shaft, a cam having an inclined face, a drive connection between the cam and the drive shaft whereby the cam may be driven at an adjustable speed ratio to that of the drive shaft, an axially movable element on the drive shaft in engagement with the movable pulley section, pins on said element adapted to engage the inclined face of the cam to provide controlled adjustment of the axially movable pulley section in accordance with the active inclined face of the cam to thus permit progressive shifting of the belt flight toward and away from the axis of rotation of the drive shaft to vary the effective speed of the drive shaft, and means to deliver pulp material to a lower zone of the scroll in advance of a vertical plane through the axis of rotation to deliver the pulp to the nadir point of the drum rotation path by scroll riffle advance and to advance the pulp upwardly within a limited arcuate path forming a zone extending from such nadir point and with the limit of said zone extending through an angular distance of approximately 90 degrees, the last named zone presenting the portion of drum travel path active in the classifying, concentrating and separating activities of the apparatus.

7. An apparatus for the classification, concentration and separation of metallic ore particles comprising an open-ended conical drum, means to support said drum with its axis approximately horizontal and extending in parallel relation to and in proximity to an axis of rotation, a scroll riffle on the inner face of the drum leading from one end zone of the drum to the opposite end zone, each convolution of the scroll riffle being of substantially triangular cross section, the angularity of the side faces of each convolution relative to the base decreasing successively from the larger end of the smaller end, means operative to move the drum in a circular path about the axis of rotation to thereby cause each riffle of a scroll convolution to travel in a circular path with the travel paths of adjacent riffles differing slightly in radius dimension relative to the axis of rotation and thereby produce varied centrifugal force values within a convolution during drum movement, said means being controllable to provide the drum advancing movement in its path of movement to accord with a predetermined speed cycler development in which the speed of advance varies continuously within definite range limits to thereby cause the centrifugal force values of a riffle to be varied during the progression of a riffle in its path of travel about the axis of rotation, whereby the assemblage of riffles will provide a multitude of centrifugal force values differing relatively as to active values during drum movement in its path with the differences of minute variation within a limiting range determined by the drum movements within its path of movement, means active to deliver pulp material to a lower zone of the scroll in advance of a vertical plane through the axis of rotation to thereby deliver the pulp to the nadir point of the drum revolution path by scroll riffle advance, and to advance the pulp upwardly within a limited arcuate path forming a zone extending from such nadir point and with the limit of such zone extending through an angular distance of approximately 90 degrees, said zone presenting the portion of the drum travel path active in the classifying, concentrating and separating activities of the apparatus, a sectional nozzled assembly for controllably spraying water within the drum and onto the scroll riffle extending linearly of and spaced from the face of the scroll riffle, the said assembly being oscillatively movable bodily through an arcuate path, the limits of which are substantially co-extensive with the active arcuate zone of the scroll riffle with the direction of oscillation angular to a plane extending normal to the axis of rotation, the angularity of inclination of the direction of oscillation being such that during the downward stroke of the oscillation cycle, the path of travel will extend in the direction of the smaller end of the drum, with the opposite or return stroke of such cycle retracking such path, an arm carried by one of the sections of the nozzled assembly, a crank connected to the said arm, and an operative connection between the crank and the means operative to move the drum in a circular path for translating rotary movement into an oscillating movement of the said sectional nozzled assembly.

8. An apparatus as defined in and claimed by claim 7 further characterized in that the water supply for each of the sections is individually controllable, with a power driven pump active to provide the water supply for all of the sections via a control station.

9. An apparatus as in claim 8 characterized in that the sections extend in linear alinement and approximately parallel to the faces of the scroll riffle, with each section carrying a plurality of nozzles adapted to provide individual spray activity upon the scroll riffle surface and its content within the path of travel of the section.

10. An apparatus as in claim 9 characterized in that the axis of oscillation is coaxial with the axis of revolution, with the formation of the sections such as to provide an assemblage having a path of oscillation slightly eccentric to the inner face of the scroll riffle.

11. An apparatus as in claim 10 characterized in that each nozzle is of generally triangular contour and hollow with one of the apices located at the top and with a vertical plane through such apex bisecting the base of the triangle, said nozzle being provided with an internal member movable upon the inner face of the base wall and operative to provide a spray of inverted-V form, with the adjustment of said member operative to vary the dimensions of the spray orifice.

JACK V. RAWLINGS.

REFERENCES CITED

The following references are of record in the file of this patent:

UNITED STATES PATENTS

| Number | Name | Date |
|---|---|---|
| 758,438 | Graupner | Apr. 26, 1904 |
| 831,545 | Dimmick | Sept. 25, 1906 |
| 1,085,596 | Earle | Feb. 3, 1914 |
| 1,147,633 | Livingston | July 20, 1915 |
| 1,271,433 | Cassel | July 2, 1918 |
| 1,340,457 | Newton | May 18, 1920 |
| 1,450,515 | Richardson | Apr. 3, 1923 |
| 1,627,648 | Johnson et al. | May 10, 1927 |
| 2,047,202 | Hardinge et al. | July 14, 1936 |
| 2,064,554 | Mahoney et al. | Dec. 15, 1936 |
| 2,065,321 | Morden | Dec. 22, 1936 |
| 2,083,674 | Smith | June 15, 1937 |